(12) United States Patent
Sugahara

(10) Patent No.: US 8,743,789 B2
(45) Date of Patent: Jun. 3, 2014

(54) RADIO ACCESS DEVICE, A RADIO ACCESS SYSTEM, A NETWORK SELECTION METHOD AND A RECORDING MEDIUM

(75) Inventor: Hiroto Sugahara, Tokyo (JP)

(73) Assignee: NEC Corporation, Tokyo (JP)

( * ) Notice: Subject to any disclaimer, the term of this patent is extended or adjusted under 35 U.S.C. 154(b) by 47 days.

(21) Appl. No.: 13/516,613

(22) PCT Filed: Dec. 14, 2010

(86) PCT No.: PCT/JP2010/072831
§ 371 (c)(1),
(2), (4) Date: Jun. 15, 2012

(87) PCT Pub. No.: WO2011/074686
PCT Pub. Date: Jun. 23, 2011

(65) Prior Publication Data
US 2012/0269127 A1 Oct. 25, 2012

(30) Foreign Application Priority Data
Dec. 18, 2009 (JP) .................................. 2009-287102

(51) Int. Cl.
*H04W 4/00* (2009.01)
*H04W 24/00* (2009.01)
*H04M 1/00* (2006.01)

(52) U.S. Cl.
USPC ..................... 370/328; 455/422.1; 455/456.1; 455/552.1

(58) Field of Classification Search
CPC combination set(s) only.
See application file for complete search history.

(56) References Cited

U.S. PATENT DOCUMENTS 8,098,590 B2 * 1/2012 Catovic et al. ................. 370/252
(Continued)

FOREIGN PATENT DOCUMENTS

| JP | 2005328409 A | 11/2005 |
| JP | 200660295 A | 3/2006 |

(Continued)

OTHER PUBLICATIONS

International Search Report for PCT/JP2010/072831, dated Mar. 1, 2011.

(Continued)

*Primary Examiner* — Clemence Han
(74) *Attorney, Agent, or Firm* — Sughrue Mion, PLLC

(57) ABSTRACT

[Issues] To provide: a radio access device, a radio access system, a network selection method and a recording medium which is capable of: in an environment where a plurality of radio access networks is intermingled, evading cut off of a communication accompanied by a movement of a radio access device; and continuing the communication more stably.

[Solution method] The radio access device includes: an acquisition means which acquires network information about a network to be used for communication from an administration entity which administers the information; and a selection means which obtains, based on the network information acquired; first information which indicates availability of a network at a current position of its own and second information which indicates availability of a network at a position other than the current position of its own, and selects a network to be used for communication using the first and the second information obtained.

19 Claims, 19 Drawing Sheets

(56) References Cited

U.S. PATENT DOCUMENTS

| | | | |
|---|---|---|---|
| 8,213,963 B2* | 7/2012 | Lee et al. | 455/456.5 |
| 8,259,659 B2* | 9/2012 | Luft et al. | 370/329 |
| 2003/0148774 A1* | 8/2003 | Naghian et al. | 455/456 |
| 2009/0184626 A1 | 7/2009 | Kim | |
| 2009/0239530 A1* | 9/2009 | Luo et al. | 455/432.1 |
| 2010/0048224 A1* | 2/2010 | Klatt | 455/456.1 |
| 2010/0093340 A1* | 4/2010 | Buracchini | 455/426.1 |
| 2010/0103873 A1* | 4/2010 | Buracchini | 370/328 |
| 2010/0273504 A1* | 10/2010 | Bull et al. | 455/456.1 |
| 2012/0015646 A1* | 1/2012 | Burbidge et al. | 455/422.1 |

FOREIGN PATENT DOCUMENTS

| | | |
|---|---|---|
| JP | 200879280 A | 4/2008 |
| JP | 2010525624 A | 7/2010 |
| WO | 2008119381 A1 | 10/2008 |

OTHER PUBLICATIONS

International Preliminary Report on Patentability for PCT/JP2010/072831, dated Mar. 1, 2011.

Written Opinion of the International Search Authority for PCT/JP2010/072831, dated Mar. 1, 2011.

P. Houze et. al., "Common Pilot Channel for Network Selection", 63rd IEEE Vehicular Technology Conference 2006 (VTC2006), pp. 67-71, 2006.

Y. Ji et. al., "CPC-assisted Network Selection Strategy", 16th IST Mobile and Wireless Communication Summit, Jul. 2007.

B. Hofmann-Wellenhof et. al., "GPS Theory and practice", pp. 286-295., Springer Verlag Tokyo Corp., 2005.

J. Perez-Romero et. al., "A Novel On-Demand Cognitive Pilot Channel Enabling Dynamic Spectrum Allocation", 2nd IEEE International Symposium on New Frontiers in Dynamic Spectrum Access Networks (DySPAN2007), pp. 46-54, 2007.

\* cited by examiner

Fig.5

|   | 1 | 2 | 3 | 4 | 5 |
|---|---|---|---|---|---|
| 1 | 0.015 | 0.020 | 0.025 | 0.020 | 0.015 |
| 2 | 0.020 | 0.040 | 0.050 | 0.040 | 0.020 |
| 3 | 0.025 | 0.050 | 0.320 | 0.050 | 0.025 |
| 4 | 0.020 | 0.040 | 0.050 | 0.040 | 0.020 |
| 5 | 0.015 | 0.020 | 0.025 | 0.020 | 0.015 |

Fig.14

```
NETWORKS WHICH CAN BE
CONNECTED

●NETWORK 1
    PROVIDED BY: OPERATOR A
    AVAILABLE AREA: WITHIN 100m

●NETWORK 2
    PROVIDED BY: OPERATOR B
    AVAILABLE AREA: 1km OR MORE

●NETWORK 3
    PROVIDED BY: OPERATOR C
    AVAILABLE AREA: 100m − 1km
```

1

RADIO ACCESS DEVICE, A RADIO ACCESS SYSTEM, A NETWORK SELECTION METHOD AND A RECORDING MEDIUM

TECHNICAL FIELD

The present invention relates to a radio access device, a radio access system, a network selection method and a recording medium including a function which, in an environment where a plurality of radio access networks (communication system or frequency band) is intermingled, selects one from among these radio access networks.

BACKGROUND ART

At present, various radio access technologies exist in a field of mobile communication and services are provided.

For example, concerning a cellular phone, W-CDMA and CDMA2000 called the third generation are widely used and further, the 3.5 generation such as HSDPA and 1xEV-DO capable of a higher-speed data transfer is also provided. In the description above, W-CDMA is an abbreviation of Wideband Code Division Multiple Access. HSDPA is an abbreviation of High Speed Downlink Packet Access. EV-DO is an abbreviation of EVolution Data Only. Also, within a couple of years, as the 3.9 generation mobile communications system, arrival of LTE (Long Term Evolution) which is with higher speed and has less delay is also expected.

On the other hand, in wireless LAN (Local Area Network), there exist WiFi and WiMAX and so on whose standard is established by IEEE 802 committee. In the description above, IEEE is an abbreviation of Institute of Electrical and Electronic Engineers. WiFi is an abbreviation of Wireless Fidelity. WiMAX is an abbreviation of Worldwide Interoperability for Microwave Access.

These radio access technologies are different in a transmission power, a frequency band and a modulation method and have characteristics respectively in a viewpoint of data transfer rate and a service area. Although its data transfer rate is inferior compared to a wireless LAN, a cellular phone can enjoy stable communication quality covering a wide range. Therefore, it can also cope with a high-speed movement. On the other hand, although its data transfer rate is large, WiFi is basically used within a limited area such as an office, home and a restaurant. Also, WiMAX is expected as a method which includes characteristics of a cellular phone and WiFi.

On the other hand, although there exists a multimode terminal which is operable in part in both of W-CDMA and WiFi, a terminal which a user carries basically supports only one kind of radio access technology for a single terminal. Therefore, even if a network with a radio access technology which a terminal can connect becomes crowded and its communication quality deteriorates, the user had no choice but to keep using it just as it is. Also, outside of a service area of a radio access technology which a terminal can connect, even if other radio access technology is served, the user could not use it. Moreover, when a plurality of radio access technologies were desired to be properly used, the user needed to hold a plurality of terminals.

In an environment where such a plurality of radio access technologies is provided, in order to realize a communication environment with high flexibility, research and development of a software radio technology are advanced. According to this technology, it makes various radio access technologies of which a transmission power, a frequency band and a modulation method are different correspond by rewriting control software of one wireless apparatus.

In order to realize a software radio technology, a terminal needs to recognize a usable radio access network (hereinafter, simply referred to as a network). As one of methods for realizing this, there exists sensing. This is what a terminal itself measures a radio wave status and recognizes a network used in a surrounding. However, such sensing needs to be carried out by a unit of channels of each radio access technology. Further, depending on a radio access technology, because frequency used is different by a country and an area, a range of a sensing target becomes enormous. Because of this, in addition to time for sensing becoming longer and delay time until a network is connected becoming larger, rapid battery consumption in a terminal takes place.

In order to solve such a problem, for example, in non-patent document 1, a technique is disclosed which notifies an available network using common pilot signal which is not dependent on a radio access technology. Such a pilot signal is called CPC (Cognitive Pilot Channel or Common Pilot Channel).

FIG. 17 is a block diagram illustrating an example of a radio access system 1 which embodies an available network notification technique indicated in the non-patent document 1. This radio access system 1 includes a plurality of networks 3-1 to 3-5 (in case of FIG. 17, for example, LTE, W-CDMA and WiFi). Also, this radio access system 1 includes a CPC transmitting station 2 to broadcast (broadcast) CPC. The CPC transmitting station 2 will broadcast CPC to a terminal 4-1 and a terminal 4-2 in CPC coverage 5. Here, a frequency band and a modulation method specified in advance are used for CPC. By first receiving CPC from the CPC transmitting station 2 after a power supply starts, the terminal 4-1 and the terminal 4-2 can know information of a network available for its own.

FIG. 18 is a figure describing characteristics of CPC broadcasted by the CPC transmitting station 2. As information of a network, CPC includes an operator (Operator), a radio access technology (Radio Access Technology: RAT) and a frequency (Frequency). As shown in FIG. 18, this information is provided for each area divided into a mesh (in case of an urban area, for example, 10 meters square). After starting the power supply, the terminal 4-1 and the terminal 4-2 grasps their current positions using GPS (Global Positioning System) and so on. After that, CPC information is received, and information of an available network in a mesh corresponding to the current position of its own is acquired. Further, a network to be connected (operator, radio access technology and frequency) is selected from among the networks given, and connection is made with this. By using a technology disclosed by the non-patent document 1, compared with a case where sensing is performed for various frequency bands, a delay time until connection is made with a network can be made short and also battery consumption in the terminal 4-1 and the terminal 4-2 can be reduced greatly.

Also, in non-patent document 2, a specific technique is disclosed which, in an environment using CPC, selects one from among a plurality of candidates of networks. According to this technique, information about the quality and the capacity of each network (delay, jitter, bandwidth, transmission rate, error rate and so on) is included in CPC information. Such an element is digitized and an objective function is built; and a network whose objective function becomes largest according to an application will be selected. As a result, it becomes possible not only to improve system performance but also to select a network with higher user satisfaction.

In the environment described above where a plurality of networks is intermingled, a form in which a terminal selects an arbitrary network and connects is positioned as one of so-called cognitive radio technology. On the other hand, as a different form of a cognitive radio, a form is studied where a certain radio access network uses a frequency band which is assigned to other system as a secondary use in case the frequency band is not used. It is also studied to apply CPC as a technique for notifying which frequency band is in a free state to a system which performs such a secondary use (base station and terminal). In this case, as described above, information of a network operating in the area concerned is transmitted by CPC. It is possible for a system which performs a secondary use to judge, among frequency bands available for a secondary use, a frequency band which is not indicated in CPC as available for a secondary use, and to select one frequency band from among them. Or, a frequency band which a system which performs a secondary use can use may be transmitted by CPC. In this case, a system side which performs a secondary use selects one frequency band from among frequency bands transmitted by CPC.

Also, as a related technology, patent document 1 describes so-called cooperative sensing. In patent document 1, a technology is disclosed which: in order to raise detection accuracy of a free frequency band, judges whether a frequency band of a usage target is free or not within a whole area where a wireless base station and a radio terminal which perform sensing exist. Specifically, in patent document 1, it is disclosed to exchange information used for judgment of free frequency bands among a plurality of wireless base stations which exist in a predetermined judgment area (for example, within a circle of radius of 5 km with a center at a predetermined wireless base station). Information used for judgment of free frequency band is, for example, a sensing result or a sensing judgment result.

PRECEDING TECHNICAL LITERATURE

Patent Document

[Patent document 1] Japanese Patent Application Laid-Open No. 2008-79280.

Non-Patent Document

[Non-patent document 1] P. Houze et. al., "Common Pilot Channel for Network Selection", 63rd IEEE Vehicular Technology Conference 2006 (VTC2006), pp. 67-71, 2006.

[Non-patent document 2] Y. Ji et. al., "CPC-assisted Network Selection Strategy", 16th IST Mobile and Wireless Communication Summit, July, 2007.

[Non-patent document 3] B. Hofmann-Wellenhof et. al., "GPS Theory and practice", pp. 286-295., Springer Verlag Tokyo Corp., 2005.

[Non-patent document 4] J. Perez-Romero et. al., "A Novel On-Demand Cognitive Pilot Channel Enabling Dynamic Spectrum Allocation", 2nd IEEE International Symposium on New Frontiers in Dynamic Spectrum Access Networks (DySPAN2007), pp. 46-54, 2007.

SUMMARY OF INVENTION

Technical Problem

In a network selection method disclosed by non-patent document 1 or non-patent document 2, a terminal selects a network to be connected using network information at a current position, in other words, a position of the terminal at a time of network selection. On the other hand, there is a possibility that the terminal may move after the network connection, and in particular, in case of a terminal which moves at high-speed, there is a possibility that it communicates at a position far away from the current position. In such case, there is a concern of a problem as shown below.

FIG. 19 is a conceptual diagram illustrating a problem in case a terminal selects a network to be connected only using network information at a current position. In FIG. 19, a case is assumed where two kinds of networks (network 1 and network 2) exist and a terminal A is positioned in a part where they overlap. The terminal A selects a network to be connected from among the network 1 and the network 2 using CPC information. Here, a mesh in the figure represents a unit of CPC information. In the following explanation, in order to identify each mesh, it will be called "mesh xy" using column number x and row number y. For example, in FIG. 19, a mesh in which the terminal A exists currently is "mesh 65". The terminal A finds that the network 1 and the network 2 are available at the current position of its own using CPC information in mesh 65. Here, in case a network selection method disclosed in non-patent document 1 or patent document 2 is used, a network to be connected is selected depending on the characteristics of the user, the quality or the capacity of the network. Therefore, for example, in case the network 2 is superior to the network 1 from a point of the capacity or the quality, the terminal A will be connected to the network 2. However, at a time when it is connected, the terminal A is positioned near the boundary of the network 2. Accordingly, depending on a movement direction of the terminal A thereafter, there is a possibility that the connection may be cut off. For example, in case the terminal A moves to a direction of an arrow in the figure, as it goes out of the coverage of the network 2, in case an appropriate handover between the networks is not formed near the boundary, there is a concern that the connection may be cut off.

Also, in case of patent document 1, there exists no entity (for example, one which corresponds to a CPC transmitting station in non-patent document 1) which integrates and administers information (in this case, information used for judgment of a free frequency band). For this reason, each wireless base station needs to acquire information separately from a plurality of other wireless base stations in the judgment area. Accordingly, for example, in case a size of the judgment area changes and a number of the wireless base stations which becomes targets changes, or in case a wireless base station is added newly to the judgment area, at each time, each wireless base station needs to set information of a wireless base station which is a communication partner (for example, address). That is, a structure of patent document 1 is completely different from a structure of non-patent document 1 which uses CPC information. Accordingly, even if non-patent document 1 (or non-patent document 2) and patent document 1 are combined, the problem mentioned above (that is, the problem that a communication is cut off with a movement of a terminal) cannot be solved.

The present invention has been made in order to solve the problem mentioned above, and the object is to provide a radio access device, a radio access system, a network selection method and a recording medium which is capable of, in an environment where a plurality of radio access networks is intermingled, evading cut off of a communication accompanied by a movement of a radio access device, and continuing the communication more stably.

Solution to Problem

In order to solve the problem, a radio access device of the present invention includes: an acquisition means which acquires network information about a network to be used for communication from an administration entity which administers the information; and a selection means which, based on the network information acquired, obtains first information which indicates availability of a network at a current position of its own and second information which indicates availability of a network at a position other than the current position of its own, and selects a network to be used for communication using the first and the second information obtained.

Also, a radio access system of the present invention is the radio access system which includes: a radio access device including a function to select, in an environment where a plurality of networks is intermingled, one from among these networks; and an administration entity which administers network information about a network which the radio access device is to use for communication; wherein the radio access device includes: an acquisition means which acquires the network information from the administration entity; and a selection means which, based on the network information acquired, obtains first information which indicates availability of a network at a current position of its own and second information which indicates availability of a network at a position other than the current position of its own, and selects a network to be used for communication using the first and the second information obtained.

Also, a network selection method of the present invention is, the network selection method in a radio access device including a function to select, in an environment where a plurality of networks is intermingled, one from among these networks; and acquires network information about a network to be used for communication from an administration entity which administers the information, and obtains, based on the information acquired, first information which indicates availability of a network at a current position of its own and second information which indicates availability of a network at a position other than the current position of its own, and selects a network to be used for communication using the first and the second information obtained.

Also, a recording medium of the present invention is, a recording medium in which a network selection program in a radio access device including a function to select, in an environment where a plurality of networks is intermingled, one from among these networks is recorded; and the network selection program makes a computer of the radio access device execute the proceedings of: acquiring network information about a network to be used for communication from an administration entity which administers the information; and obtaining, based on the network information acquired, first information which indicates availability of a network at a current position of the radio access device and second information which indicates availability of a network at a position other than the current position, and selecting a network to be used for communication using the first and the second information obtained.

Advantageous Effects of Invention

According to the present invention, in an environment where a plurality of radio access networks is intermingled, it becomes possible to evade cut off of a communication accompanied by a movement of a radio access device and to continue the communication more stably.

BRIEF DESCRIPTION OF DRAWINGS

[FIG. 5] is a conceptual diagram illustrating a technique which, in the second exemplary embodiment, concerning a technique which evaluates spatial availability of a network and selects a network, defines a weight for each mesh of CPC; and in detail, a CPC mesh table showing an example of weight distribution for each mesh.

[FIG. 14] illustrates an example of display of a list of candidate networks displayed on a display screen of the radio access device shown in FIG. 12.

DESCRIPTION OF EMBODIMENTS

Figure 1:
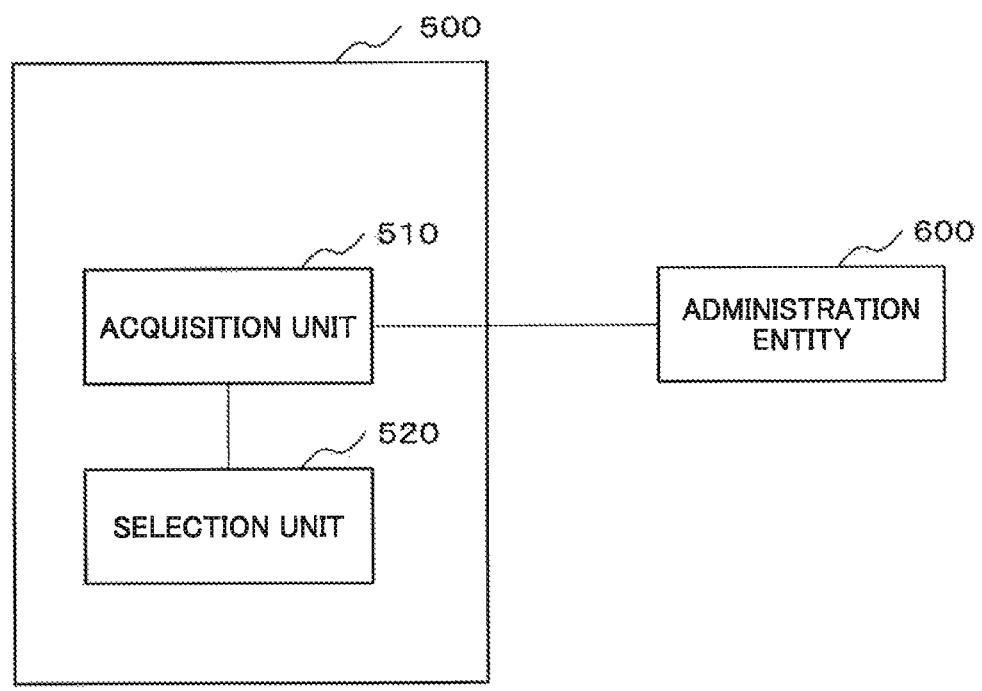
[FIG. 1] is a block diagram illustrating an exemplary configuration of a radio access device according to the first exemplary embodiment of the present invention.

[The First Exemplary Embodiment]
FIG. 1 is a block diagram illustrating an exemplary configuration of a radio access device 500 according to the first exemplary embodiment of the present invention. The radio access device 500 is, for example, a mobile terminal station or a mobile relay station. In an environment where a plurality of networks (for example, communication system or frequency band) is intermingled, the radio access device 500 has a function to select one from among these networks.

The radio access device 500 includes an acquisition unit 510 (acquisition means) and a selection unit 520 (selection means). The acquisition unit 510 acquires network information about a network to be used for communication from an administration entity 600 which administers the information concerned. The selection unit 520 obtains first information which indicates availability of a network at a current position of its own (that is, the radio access device 500) and second information which indicates availability of a network at a position other than the current position of its own based on the acquired network information. The selection unit 520 selects a network to be used for communication using the first and the second information obtained.

In the first exemplary embodiment described above, a network to be used for communication is selected considering not only network availability information at a current position but also network availability information at a position other than the current position. Accordingly, a network is selected which is capable of a continuous communication without cut off even in case the radio access device 500 moves from the current position after connection. Accordingly, the radio access device 500 of this exemplary embodiment is superior to non-patent document 1 (or non-patent document 2) mentioned above in the continuity of the communication.

Further, firstly, in the first exemplary embodiment, "network" is, for example, detailed information of a communication system in operation (in other words, available communication system), or available frequency band for a secondary use in cognitive radio. Also, "network information" is, specifically and for example, CPC information indicated in non-patent document 1. Of course, the network information is not limited to the CPC information.

Secondly, in the administration entity 600, network information is administered, for example, collectively as a database. Contents of the database may be updated periodically and maintained to a latest state.

Thirdly, the radio access device 500 can acquire network information by a broadcast (broadcast) of the administration entity 600 or can acquire it by requesting the administration entity 600 by itself. Moreover, the radio access device 500 can acquire the network information by accessing the database directly.

Figure 17:
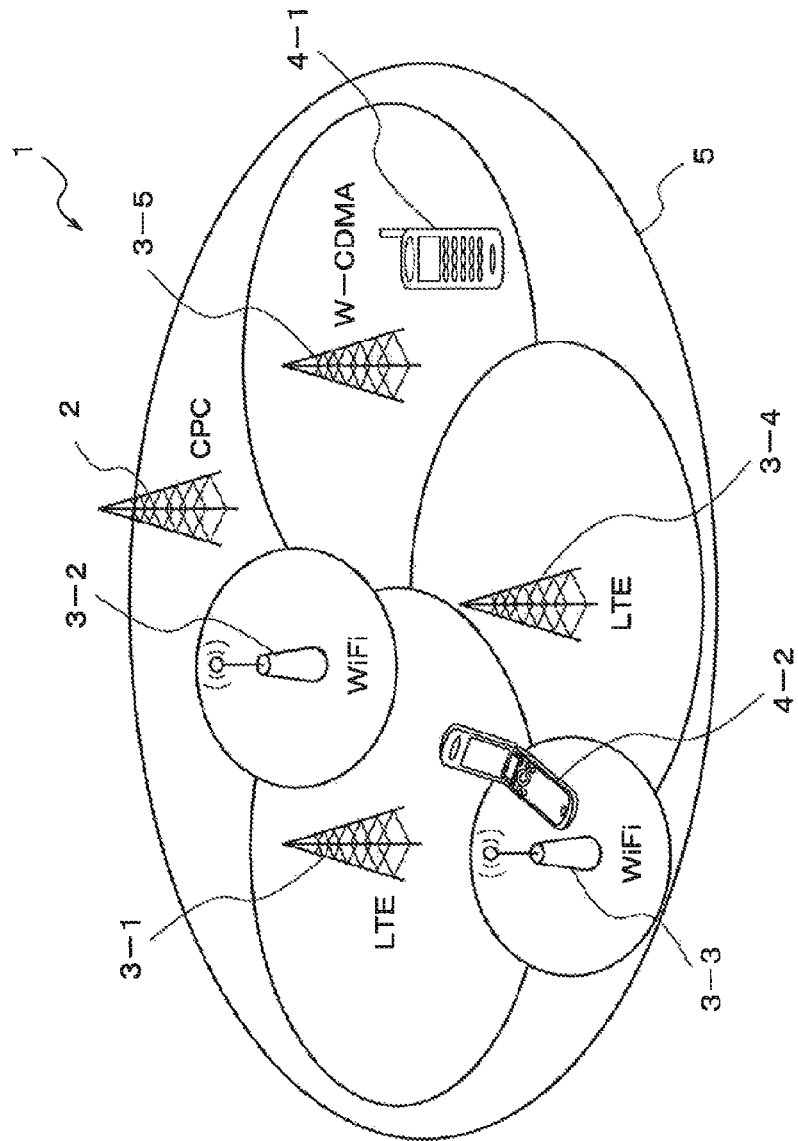
[FIG. 17] is a block diagram illustrating an example of a radio access system which embodies an available network notification technique indicated in non-patent document 1.
Figure 18:
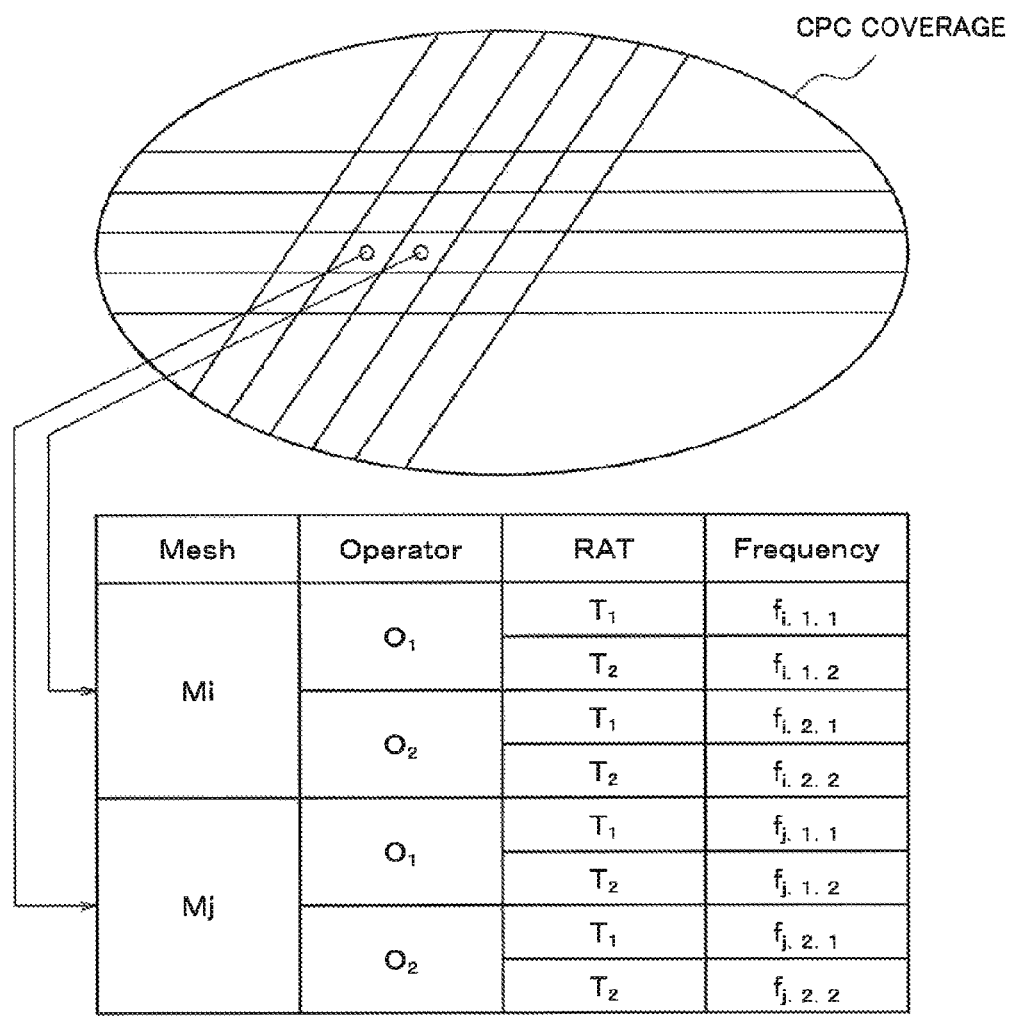
[FIG. 18] is a figure describing characteristics of CPC broadcasted by a CPC transmitting station shown in FIG. 17.
Figure 19:
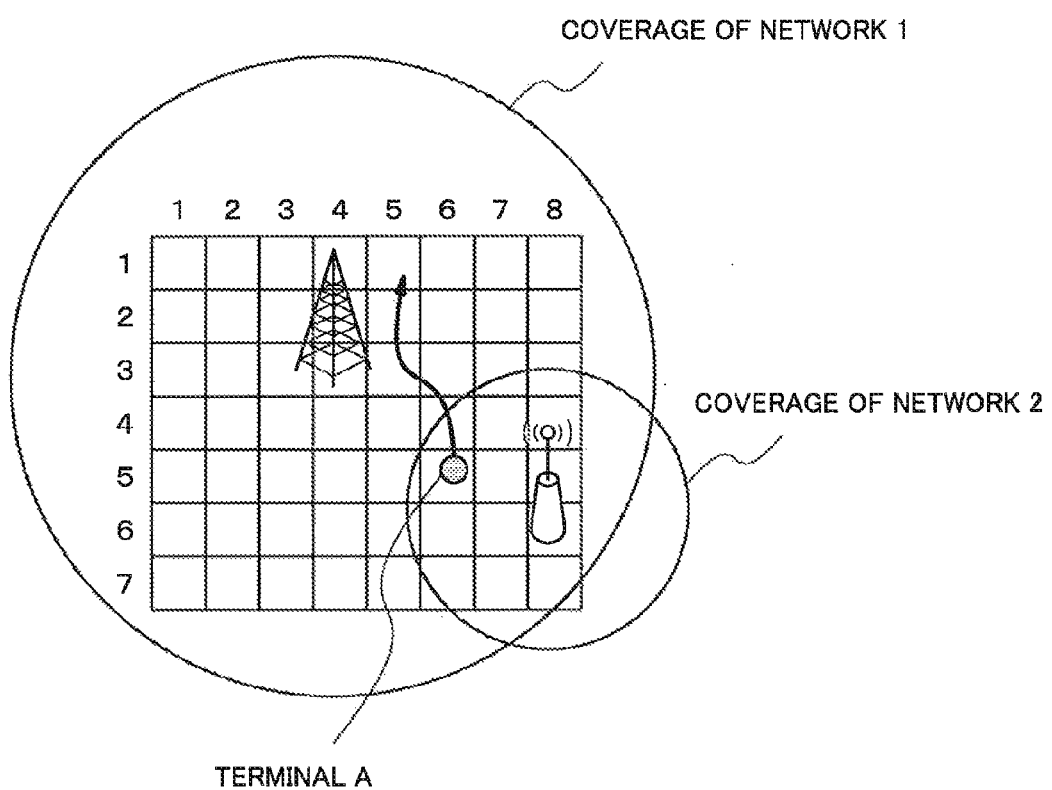
[FIG. 19] is a conceptual diagram illustrating a problem in case, in a technology indicated in non-patent document 1 and non-patent document 2, a terminal selects a network to be connected network only using network information at a current position.

Fourthly, the administration entity 600 may be of "out-of-band method" or of "in-band method". The out-of-band method is, for example, a method in which, same as a CPC transmitting station 2 shown in FIG. 17, other exclusive network different from each of existing networks 3-1 to 3-5 provides network information to a radio access device (for example, mobile terminal station or mobile relay station). On the other hand, the in-band method is a method in which an exclusive network is not set up, but at least one network of each of existing networks 3-1 to 3-5 provides network information to a radio access device. Here, as an example of one network, for example, a network with solid coverage such as GSM (Global System for Mobile Communications) can be mentioned. The radio access device (mobile terminal station or mobile relay station) first connects with this GSM network and receives CPC information, and after that, selects a network used for circulation based on the CPC information.

Fifthly, in the out-of-band method, the administration entity 600 may exist in plural. For example, the radio access device 500 which exists in an area where coverage of each of the administration entities 600 overlaps with each other can acquire "network information" from each of the administration entities 600 respectively.

The first to the fifth items described above can be said to apply similarly to the second to the seventh exemplary embodiments described below

[The Second Exemplary Embodiment]

Figure 2:
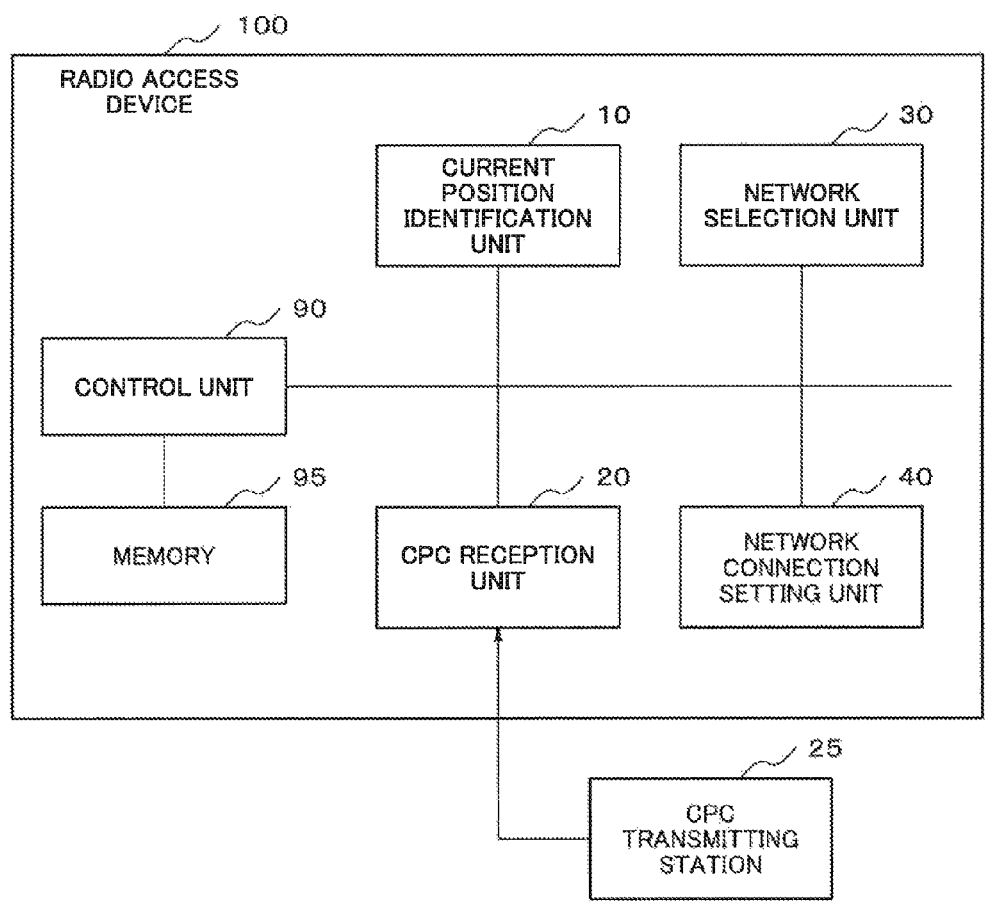
[FIG. 2] is a block diagram illustrating an exemplary configuration of a radio access device according to the second exemplary embodiment of the present invention.

FIG. 2 is a block diagram illustrating an exemplary configuration of a radio access device 100 according to the second exemplary embodiment of the present invention. The radio access device 100 includes, in an environment where a plurality of networks (for example, in case of the second to the sixth exemplary embodiments, they are "communication systems"; and in case of the seventh exemplary embodiment, they are "frequency bands") is intermingled, a function to select one from among these networks. Further, according to the second to the sixth exemplary embodiments described below, a case is supposed where a network is a communication system.

The radio access device 100 includes: a current position identification unit 10, a CPC reception unit 20 (acquisition means), a network selection unit 30 (selection means), a network connection setting unit 40, a control unit 90 and a memory 95.

The current position identification unit 10 identifies a current position of the radio access device 100 and recognizes it by a predetermined form such as latitude and longitude or a UTM (Universal Transverse Mercator) coordinates. For example, a GPS (Global Positioning System) positioning device is used. The GPS positioning device receives time data which is radiated from a plurality of satellites which orbit around the earth and position a current position by their time differences.

The CPC reception unit 20 receives CPC information broadcasted (broadcast) in the area concerned and stores it in the memory 95. It is supposed that information of an available network is stored in the CPC information for each area divided into a mesh. Specifically, an operator, a radio access technology and a used frequency are included. In addition to this, information about the quality and the capacity of each network such as a delay, a jitter, bandwidth, a transmission rate and an error rate may be included. Moreover, an identifier representing a geographical available range of the network concerned may be included. For example, an identifier which identifies whether it is a network available only in a limited area such as a wireless LAN or a network which has almost no limits in the area such as a cellular phone may be included. The CPC reception unit 20 receives the CPC information from all of receivable CPC transmitting stations 25. At that time, the CPC reception unit 20 receives the information of all of the meshes at least within a predetermined distance (1 km, for example) from the current position and stores it in the memory 95. Here, "all of CPC transmitting stations" is an expression including a case where a plurality of CPC transmitting stations 25 exists, and of course, there may exist only one CPC transmitting station 25. Further, in this exemplary embodiment, a case is given as an example where an out-of-band method is employed and there exists only one CPC transmitting station 25, and in this case, coverage of the CPC transmitting station 25 is called hereinafter CPC coverage. Of course, the CPC transmitting station 25 is not limited to be of an out-of-band method, and it may be of an in-band method. The CPC transmitting station in the case can be made at least one network among each of the existing networks, and for example, a network of which coverage is most solid.

The network selection unit 30 selects a network to which the radio access device 100 connects using the network information received by the CPC reception unit 20. In that case, not only information of a mesh corresponding to the current position but also information of the surrounding meshes is also considered. Specific network selection method in the network selection unit 30 will be described later.

The network connection setting unit 40 sets a connection to the network decided by the network selection unit 30. Specifically, a radio access technology and a frequency are set by rewriting control software of its own.

The control unit 90 controls whole of the radio access device 100. The memory 95 is a working memory, and stores mesh information within a predetermined range.

Figure 3:
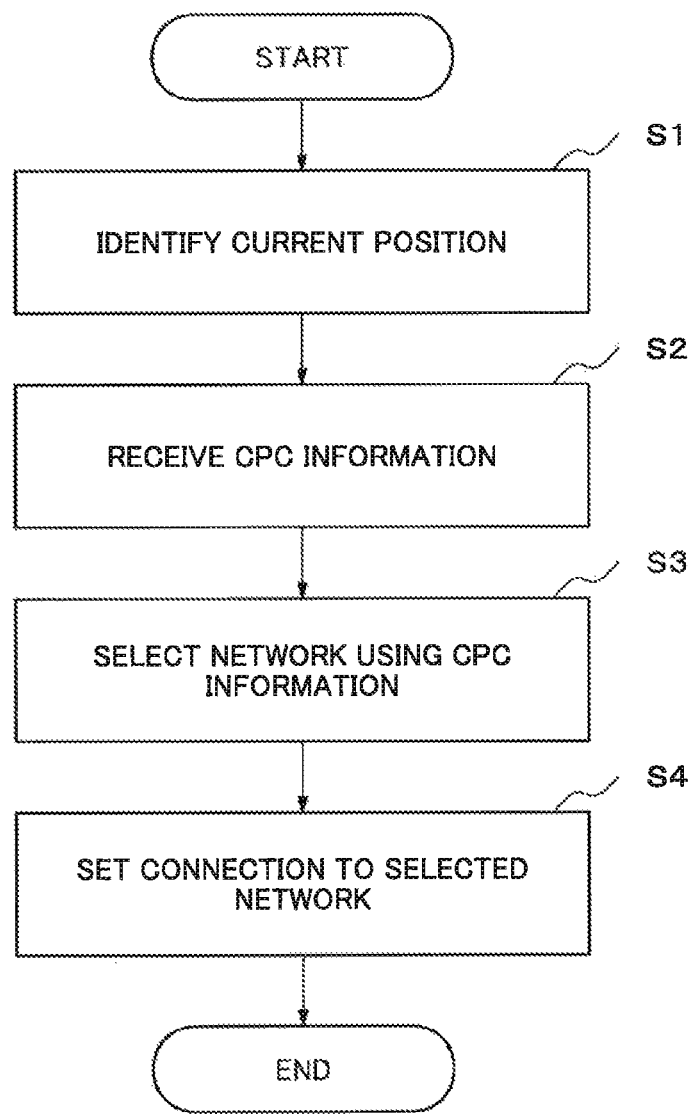
[FIG. 3] is a flow chart illustrating an example of operation of the radio access device shown in FIG. 2.

FIG. 3 is a flow chart illustrating an example of operation of the radio access device 100 shown in FIG. 2. First, the current position identification unit 10 identifies a current position of the radio access device 100 (Step S1). Next, the CPC reception unit 20 receives CPC information broadcasted in CPC coverage (Step S2) and stores the information in the memory 95. It is supposed that, in the CPC information which is broadcasted here, information is stored for each area divided into a mesh. Here, as specific contents of the CPC information, the following two cases are considered. The first is a case of only information of an operator, a radio access technology and a used frequency of an available network; and the second is a case where information about the quality and the capacity of each network such as a delay, a jitter, bandwidth, a transmission rate and an error rate is included in addition. Although it is supposed here that the received information of all of the meshes is stored in the memory 95, information within a predetermined distance (1 km, for example) from the current position may be stored in the memory 95.

And, the network selection unit 30 selects a network which the radio access device 100 connects from among available networks using the received CPC information (Step S3). The network connection setting unit 40 sets a connection to the selected network (Step S4). Specifically, a radio access technology and a frequency are set by rewriting control software of its own.

Figure 4:
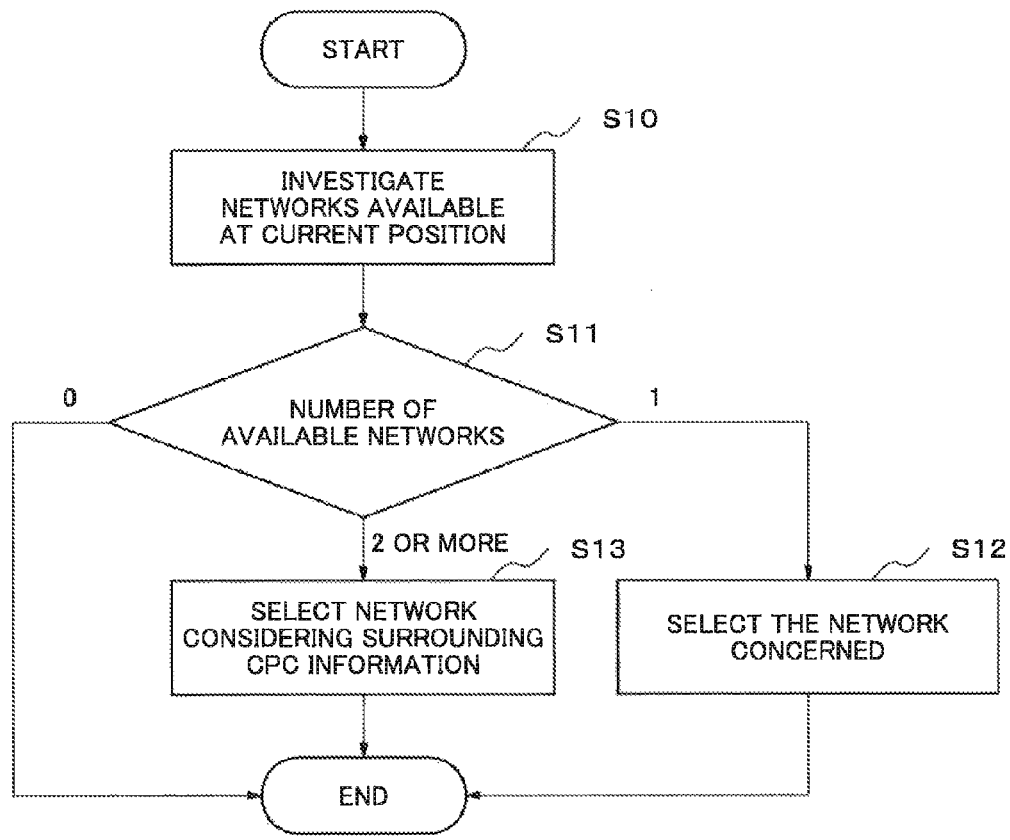
[FIG. 4] is a flow chart illustrating a detailed example of operation of a network selection method (processing of Step 3 in FIG. 3).

FIG. 4 is a flow chart illustrating a detailed example of operation of the network selection method (processing of Step 3 in FIG. 3). The network selection unit 30 investigates an available network at the current position of the radio access device 100 using the CPC information received by the CPC reception unit 20 (Step S10). The network selection unit 30 judges a number of networks available at the current position (Step S11). In case the number of networks available at the current position is "0", the network selection unit 30 ends without selecting a network to be connected. In case the number of networks available at the current position is "1", the network selection unit 30 selects the network as a connection target (Step S12). In case the number of networks available at the current position is "2 or more", the network selection unit 30 obtains network availability information at the current position (the first information) and network availability information in a surrounding (the second information) using the received CPC information. The network selection unit 30 evaluates a spatial availability of each network based on them and selects a network (Step S13). As a technique to evaluate a spatial availability of a network and to select a network, three examples are given below.

The first technique is a technique which uses an available range based on a current position of the radio access device 100. In this technique, first, the radio access device 100 investigates in which degree of range each network is available based on the current position. In that case, among the received CPC information, information of other than the mesh corresponding to the current position is also utilized. Here, it is defined by a distance from the current position to a boundary of the available range. However, because an area where a network is available does not necessarily spread like a circle with the current position as a center, here, the distance is defined along a direction with a smallest available range. However, a method to define an available range is not limited to the method described above as far as it represents an available range based on the current position. For example, instead of defining a distance along a direction with a smallest available range, it may be defined by an average over all the directions, or may be defined by an area instead of a distance.

Next, a network to be connected is selected using the obtained available range. In case information of CPC which is broadcasted is only information of an operator, a radio access technology, and a frequency of an available network, a network of which the calculated available range becomes largest may be selected. On the other hand, in case information about the quality and the capacity of each network such as a delay, a jitter, bandwidth, a transmission rate and an error rate is included in the information of CPC which is broadcasted, the following processing can be performed. It is also possible to select a network by adding an element of an available range to these elements, and by using a technique to derive one solution considering a plurality of elements, for example, such as an AHP technique or a GRA technique described in non-patent document 2. In the description above, AHP is an abbreviation of Analytic Hierarchy Process. GRA is an abbreviation of Grey Relational Analysis.

The second technique is a technique to define a weight for each mesh of CPC. In this technique, a weight (w) is defined based on a distance from the current position of the radio access device 100 to a center position of a mesh such that the longer the distance becomes, the smaller it becomes. The definition of the weight is carried out in the radio access device 100 based on a result of the positioning results in Step S10.

FIG. 5 is a conceptual diagram illustrating a technique which defines a weight for each mesh of CPC and in detail, is a CPC mesh table showing an example of weight distribution for each mesh. In FIG. 5, it is supposed that the radio access device 100 is positioned in mesh 33 currently. This mesh 33 is made a center mesh, and a weight of each mesh basically becomes largest at the center mesh, and for a surrounding mesh the farther it leaves from the center mesh, the smaller the value will be. Further, a range of meshes for which the weight is defined may be all of the meshes of the CPC information received from the CPC transmitting station 25, or meshes whose center positions are within a predetermined distance (1 km, for example) from the current position. Next, a network to be connected is selected using the obtained weight.

A case will be described where the broadcasted CPC information is only information of an operator, a radio access technology, and a used frequency of an available network. In this case, for a network of selection candidate, a weight of a mesh where the network concerned is available is totaled, and a network whose total becomes largest may be selected. For example, a case where a network 1 and a network 2 are selection candidates is given as an example. Here, it is supposed provisionally that the network 1 is available in meshes 22, 32, 23 and 33, and the network 2 is available in meshes 33, 43, 53 and 44. In this case, a total of the weight of the network 1 is 0.040+0.050+0.050+0.320=0.46. On the other hand, a total of the weight of the network 2 is 0.320+0.050+0.025+0.040=0.435. Accordingly, in this case, the network 1 whose total of the weight is larger is selected.

A case will be described where information about the quality and the capacity of each network such as a delay, a jitter, bandwidth, a transmission rate and an error rate is included in the information of CPC which is broadcasted. In this case, a value which averaged respective elements mentioned above using the weight of each mesh is calculated. Based on the calculated average value of each element, a network is selected using a technique to derive one solution considering a plurality of elements, for example, such as an AHP technique or a GRA technique mentioned above. Or, one network is extracted using such as an AHP technique or a GRA technique for each mesh, and by totaling weights of each mesh for respective networks, a network whose total becomes largest may be selected as a connection target.

Further, in the second technique described above, although a case where the weight of the center mesh is largest was given as an example, the weight of the center mesh does not necessarily be largest, and can be set to an arbitrary weight.

The third technique is a technique which uses an identifier representing a geographical available range of the network concerned. In this technique, it is a presumption that an identifier representing a geographical available range of each network is included in the CPC information received from the CPC transmitting station 25. The network selection unit 30 selects a network to be connected using this identifier.

A case will be described where the CPC information is only information of an operator, a radio access technology and a used frequency of an available network. In this case, the network selection unit 30 may refer to the CPC information of the current position of the radio access device 100, and select a network to which an identifier showing that an available area is not limited is added.

A case will be described when information about the quality and the capacity of each network such as a delay, a jitter, bandwidth, a transmission rate and an error rate is included in the CPC information. In this case, the network selection unit 30 selects a network by adding also an element of the identifier mentioned above to these elements, and by using, for example, such as an AHP technique or a GRA technique.

Further, in case of network selection (processing of Step S3 in FIG. 3), it is desirable that the network selection unit 30 estimates in advance a time (expected communication time) which is required for the communication thereafter before selecting a network. Further, the expected communication time can be estimated by considering an application which the radio access device 100 is to use or communication data size. And, it is desirable that, in case this expected communication time is longer than a predetermined time (for example, 1 minute), the network selection unit 30 selects a network to which the radio access device 100 connects from among available networks using the received CPC information. Also, the network selection unit 30 can change a weighting method in the second technique mentioned above based on the expected communication time.

Further, concerning the network selection, depending on a type of user's contract or an application used and so on, there is a case where a limitation of use or a priority exists for a network which becomes a connection target. In such a case, it is desirable to perform network selection by considering such user's context information or preference information. For example, in case there exists a limitation in a network which becomes a connection target, the network selection unit 30 excludes a network with limitation among available networks indicated in the CPC information. Also, in case there exists a priority in a network which becomes a connection target, the network selection unit 30 selects a network by making this information as one element, and by using, for example, such as the AHP technique or the GRA technique mentioned above. Further, the context information and the preference information mentioned above may be registered inside the radio access device 100 in advance, or the information may be held on a network side and be notified the radio access device 100 according to the need.

In the second exemplary embodiment, the radio access device 100 selects a radio access network using also the network information in a surrounding in addition to the network information at the current position of its own. In the above description, the network information at the current position of its own is the information (the first information) of the mesh in which the radio access device 100 is currently positioned. Also, the network information in a surrounding is the information (the second information) of at least one mesh in which the radio access device 100 is not currently positioned. That is, the radio access device 100 calculates a spatial availability of a network using the network information and selects a network to be used based on the calculated spatial availability. Accordingly, a network is selected which is capable of continuous communication without cut off even in case the radio access device 100 moves from the current position after connection. Accordingly, the radio access device 100 of this exemplary embodiment is superior to non-patent document 1 (or non-patent document 2) mentioned above in the continuity of the communication.

[The Third Exemplary Embodiment]

Figure 6:
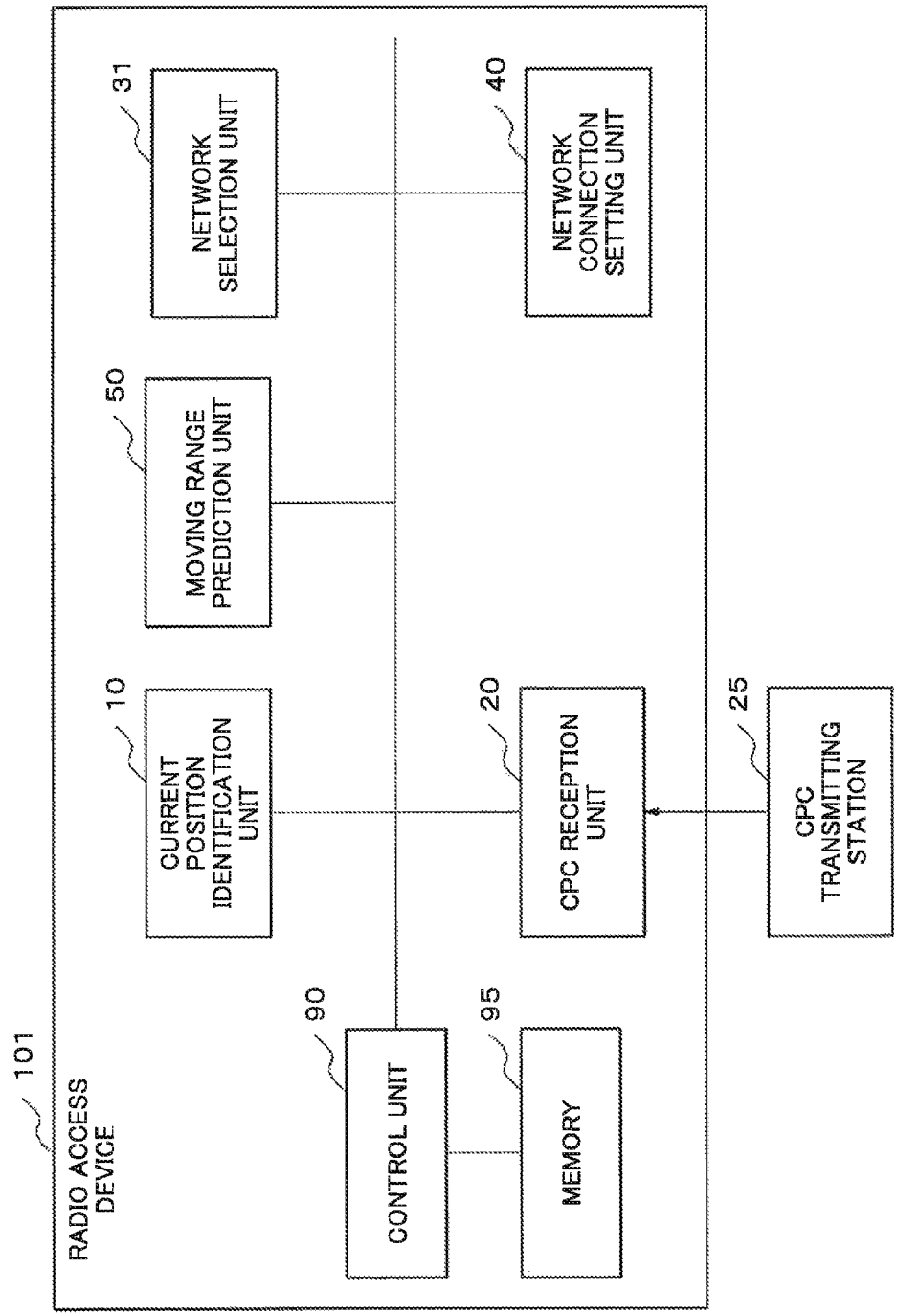
[FIG. 6] is a block diagram illustrating an exemplary configuration of a radio access device according to the third exemplary embodiment of the present invention.

FIG. 6 is a block diagram illustrating an exemplary configuration of a radio access device 101 according to the third exemplary embodiment of the present invention. The radio access device 101 of this exemplary embodiment newly includes a moving range prediction unit 50 (moving range prediction means) in addition to the radio access device 100 of the second exemplary embodiment shown in FIG. 2. In the radio access device 101, because the current position identification unit 10, the CPC reception unit 20, the network connection setting unit 40, the control unit 90 and the memory 95 are the same as the radio access device 100 of the second exemplary embodiment, the description about their details will be omitted. Further, although a network selection unit 31 is basically similar to the network selection unit 30 of the first exemplary embodiment, its operation is different in part in relation to the moving range prediction unit 50. Its operation will be described later.

The moving range prediction unit 50 predicts to what range the radio access device 101 moves in a predetermined time. Here, it is desirable to specify the predetermined time by a duration time of communication predicted by the radio access device 101. Specifically, in the radio access device 101, duration of a call or a time needed for communication such as web browsing are recorded, and their average may be used.

Figure 7:
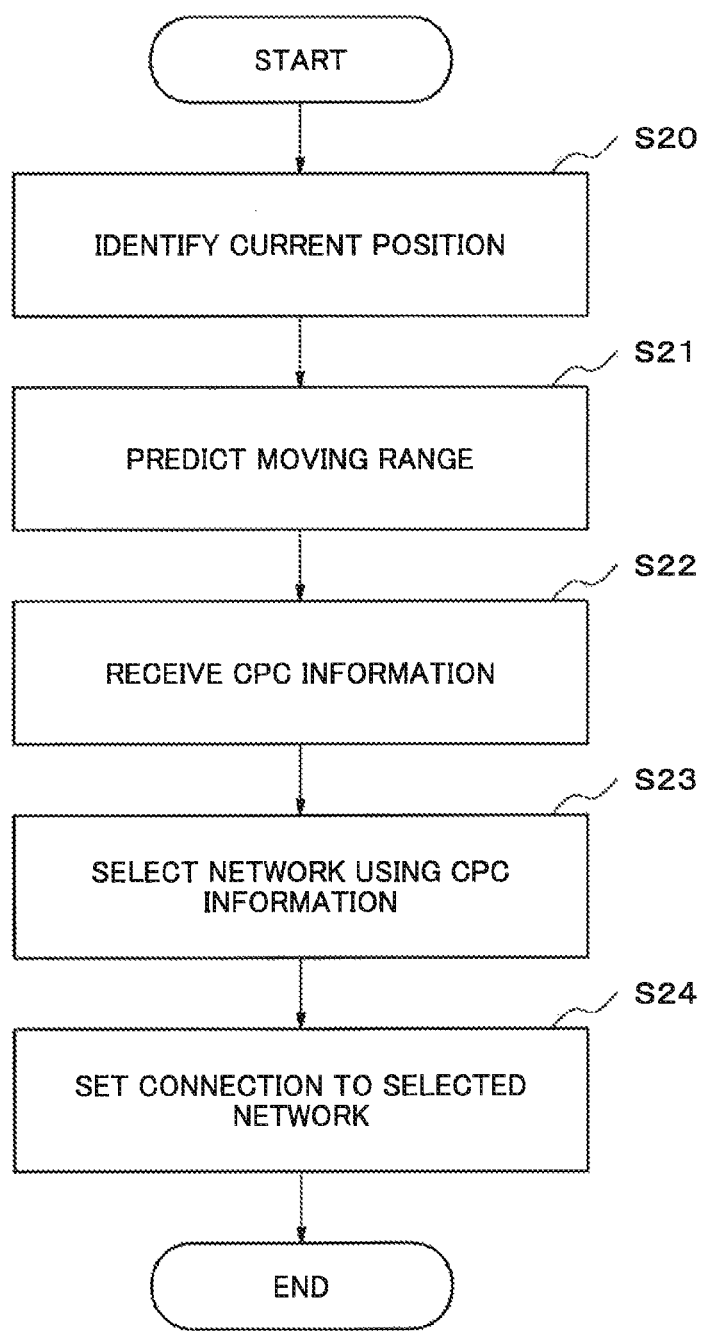
[FIG. 7] is a flow chart illustrating an example of operation of the radio access device shown in FIG. 6.

FIG. 7 is a flow chart illustrating an example of operation of the radio access device 101 shown in FIG. 6. First, the current position identification unit 10 identifies a current position of the radio access device 101 (Step S20).

Next, the moving range prediction unit 50 predicts to what range the radio access device 101 moves in a predetermined time (Step S21). Further, the predetermined time here is, for example, the expected communication time mentioned above. As a specific estimation method of a moving range, several examples are indicated below.

As a first estimation method, a method to use a typical value of moving speed can be mentioned. For example, moving speed of a pedestrian is about 3 km/h. The moving range prediction unit 50 calculates a distance one moves in a predetermined time based on the value, and makes a circular area with the current position as a center and with the calculated distance as a radius a moving range.

As a second estimation method, a method to estimate a moving range based on a prediction of moving speed and moving direction can be mentioned. Specifically, first, the moving range prediction unit 50 measures a position of the radio access device 101 at a plurality of times and creates position history information. Next, the moving range prediction unit 50 predicts the moving speed and the moving direction of the radio access device 101 using this position history information and calculates a range that it moves in a predetermined time using this. As a specific prediction method, for example, a method to use a Kalman filter can be mentioned. Details of a prediction method to use the Kalman filter are disclosed, for example, in non-patent document 3.

A third estimation method is a technique to use information inputted by a user of the radio access device 101. Specifically, a map, for example, is displayed on the radio access device 101, and the user designates a movement destination in future on it. Or, a database which correlates a position of the institution concerned with an address or a telephone number is held, and a movement destination may be identified by the user's designating the address or the telephone number. Moreover, in case the radio access device 101 includes a navigation function, by cooperating with this function, a place designated as a destination may be identified as a movement destination in future. The moving range prediction unit 50 makes an area including the current position and the position of the identified movement destination a moving range.

Further, when predicting a moving range, it is desirable to quantify a probability to which it can move inside the predicted range by a unit of mesh of CPC. For example, in case of the first estimation method, the current position is set to the highest probability, and the farther away from the current position, the lower the probability is made. In case of the second estimation method, on the line of the predicted movement direction is set to high probability, and the farther away from the line, the lower the probability is made. In case of the third estimation method, on the path which connects the current position and the position of the movement destination is set to high probability, and the farther away from the path, the lower the probability is made.

Going back to the description of FIG. 7, the CPC reception unit 20 receives CPC information broadcasted in CPC coverage (Step S22). Next, the network selection unit 31 selects a network to which the radio access device 101 connects from among available networks using the received CPC information (Step S23). The network connection setting unit 40 sets a connection to the selected network (Step S24).

Here, a network selection method of the network selection unit 31 will be described. Further, the network selection unit 30 of the second exemplary embodiment selects a network by considering the current position obtained and each of network availability information in its surrounding based on the CPC information and by evaluating a spatial availability of each network (refer to Step S13 in FIG. 4). Further, according to the second exemplary embodiment, it was explained that, as the first technique of Step S13, the available range based on the current position was used. In contrast, in this exemplary embodiment (that is, processing of Step S23 in FIG. 7), not this available range but an availability ratio of a network for the moving range predicted in Step S21 is used. Specifically, among a number of meshes of which a center position is positioned in the moving range predicted in Step S23, a number of meshes in which a network is available is defined as an availability ratio of the network concerned. Next, by using the obtained availability ratio instead of the available range, and by the same technique as the first technique of Step S13 of the second exemplary embodiment, a network to be connected is selected.

Also, as the second technique of Step S13 of the second exemplary embodiment, a technique to define a weight for each mesh of CPC was mentioned. In this exemplary embodiment (that is, processing of Step S23 in FIG. 7), a weight is given based on a movable probability which is calculated by a unit of mesh of CPC in Step S21. For example, a probability calculated by a unit of mesh is adopted as the weight of the mesh concerned just as it is. Next, by using the obtained weight, and by the same technique as the second technique of Step S13 of the second exemplary embodiment, a network to be connected is selected.

Further, as for processing in case there exists on a user side a limitation or a priority for a network which becomes a connection target, it is the same as described in the second exemplary embodiment.

According to the third exemplary embodiment described above, similar to the second exemplary embodiment, a network is selected which is capable of continuous communication without cut off even in case the radio access device 101 moves from the current position after connection. Further, in case of this exemplary embodiment, the radio access device 101 predicts to what range to move in a predetermined time, and based on an availability ratio of a network for the predicted moving range, a network to be used is selected. Accordingly, compared with the second exemplary embodiment, it can further enhance the continuity of the communication.

[The Fourth Exemplary Embodiment]

Figure 8:
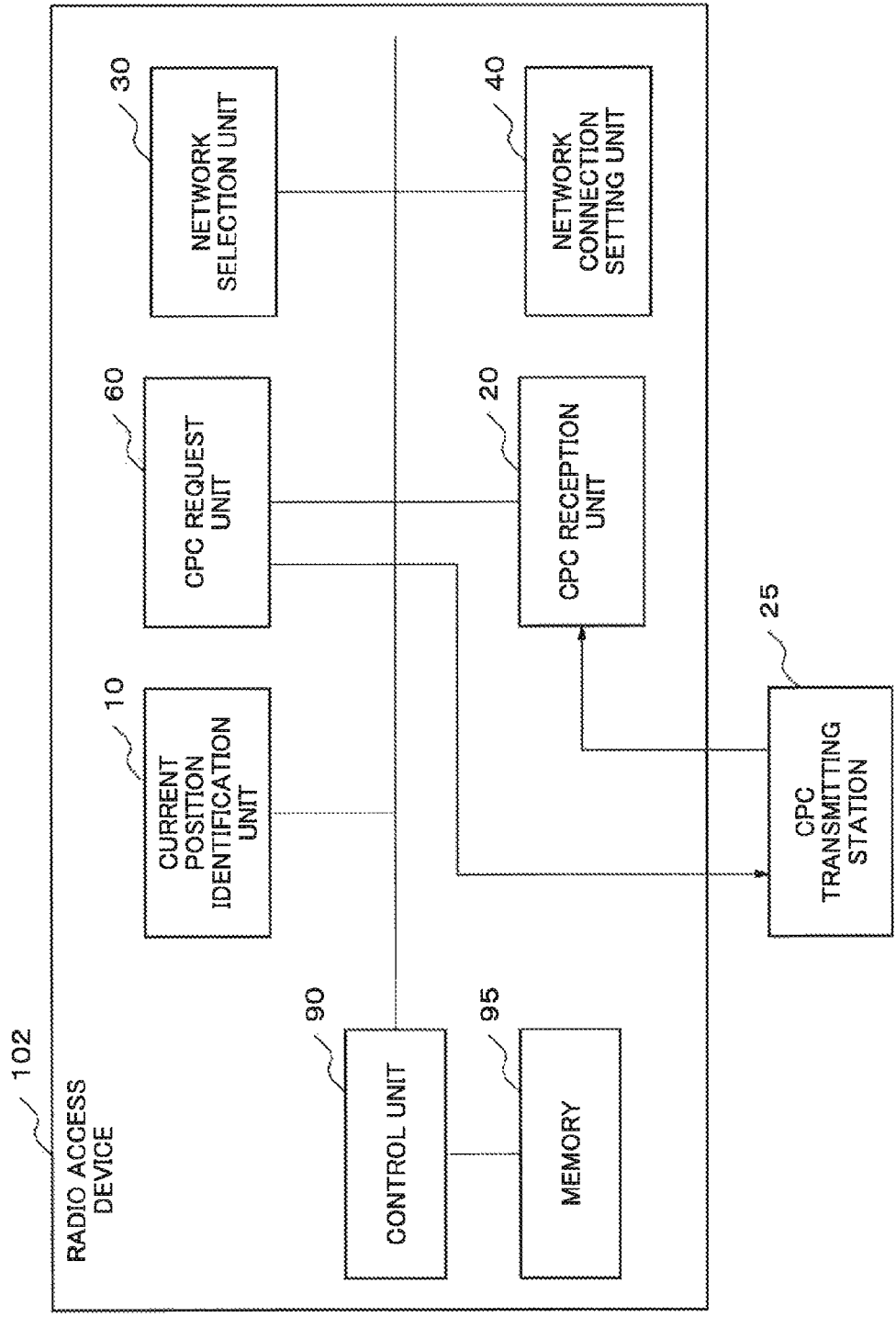
[FIG. 8] is a block diagram illustrating an exemplary configuration of a radio access device according to the fourth exemplary embodiment of the present invention.

FIG. 8 is a block diagram illustrating an exemplary configuration of a radio access device 102 according to the fourth exemplary embodiment of the present invention. The radio access device 102 of this exemplary embodiment newly includes a CPC request unit 60 (CPC request means) in addition to the radio access device 100 of the second exemplary embodiment shown in FIG. 2. In the radio access device 102, because the current position identification unit 10, the CPC reception unit 20, the network selection unit 30, the network connection setting unit 40, the control unit 90 and the memory 95 are the same as the radio access device 100 of the second exemplary embodiment, their description will be omitted.

The CPC request unit 60 requests to a CPC transmitting station 25 notification of CPC information to the radio access device 102. Concerning CPC, there exist not only a broadcast type (broadcast type) described in non-patent document 1 or non-patent document 2 but also an on-demand type which notifies the CPC information based on a request from the radio access device 102. Details of the on-demand type CPC is disclosed in non-patent document 4. This exemplary embodiment is one which corresponds to CPC of this on-demand type.

Figure 9:
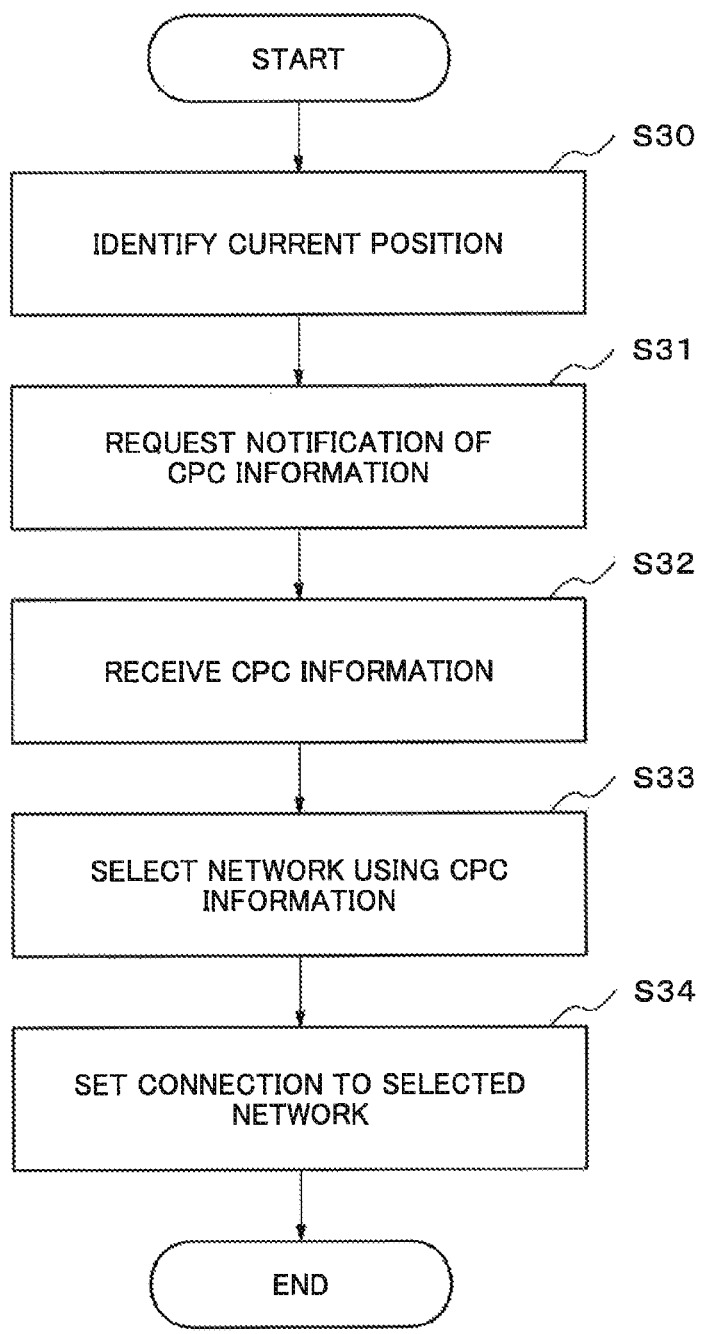
[FIG. 9] is a flow chart illustrating an example of operation of the radio access device shown in FIG. 8.

FIG. 9 is a flow chart illustrating an example of operation of the radio access device 102 shown in FIG. 8. First, the current position identification unit 10 identifies a current position of the radio access device 102 (Step S30). Next, the CPC request unit 60 requests to the CPC transmitting station 25 notification of the CPC information to the radio access device 102 (Step S31). In that case, the CPC request unit 60 notifies the CPC transmitting station 25 of the current position of the radio access device 102. Further, what is important here is, when requesting notification of the CPC information, not only information of a mesh in which the radio access device 102 is currently positioned but also information of all the meshes which are within a predetermined distance (1 km, for example) from the current position are notified. This setting may be decided between the radio access device 102 and the CPC transmitting station 25 as default in advance, or to send it as a parameter from the radio access device 102 to the CPC transmitting station 25 whenever notification is requested is also possible.

Because processing of Step S32 (reception processing of the CPC information), processing of Step S33 (network selection processing using the CPC information) and processing of Step S34 (connection setting processing to a selected network) in FIG. 9 are as have been described in the second exemplary embodiment, the description here will be omitted.

Further, in the description above, as an example in which the fourth exemplary embodiment (that is, a structure which requests notification of the CPC information) is applied, a case where it was applied to the second exemplary embodiment was given as an example. However, it is also possible for the fourth exemplary embodiment to be applied to the third exemplary embodiment or to an exemplary embodiment which combined the second and the third exemplary embodiment. For example, in case the fourth exemplary embodiment is applied to the third exemplary embodiment, in a flow chart shown in FIG. 7, processing which requests notification of the CPC information to the CPC transmitting station 25 should be added after prediction of a moving range (Step S21). By doing so, it becomes possible to limit the notification of the CPC information to the CPC information within the predicted moving range. That is, because it is possible to suppress it to sending and receiving of only minimum information required for the processing, it becomes possible to reduce a processing load of both of the CPC transmitting station 25 and the radio access device 102, and a load of a communication channel.

Further, as for processing in case there exists on a user side a limitation or a priority for a network which becomes a connection target, it is the same as described in the second exemplary embodiment.

According to the fourth exemplary embodiment described above, similar to the second exemplary embodiment, a network is selected which is capable of continuous communication without cut off even in case the radio access device 102 moves from the current position after connection. Further, in case of this exemplary embodiment, the radio access device 102 adopts a structure in which it requests notification of the CPC information to the CPC transmitting station 25. As a result, it is also possible to correspond to a CPC system of an on-demand type.

[The Fifth Exemplary Embodiment]

Figure 10:
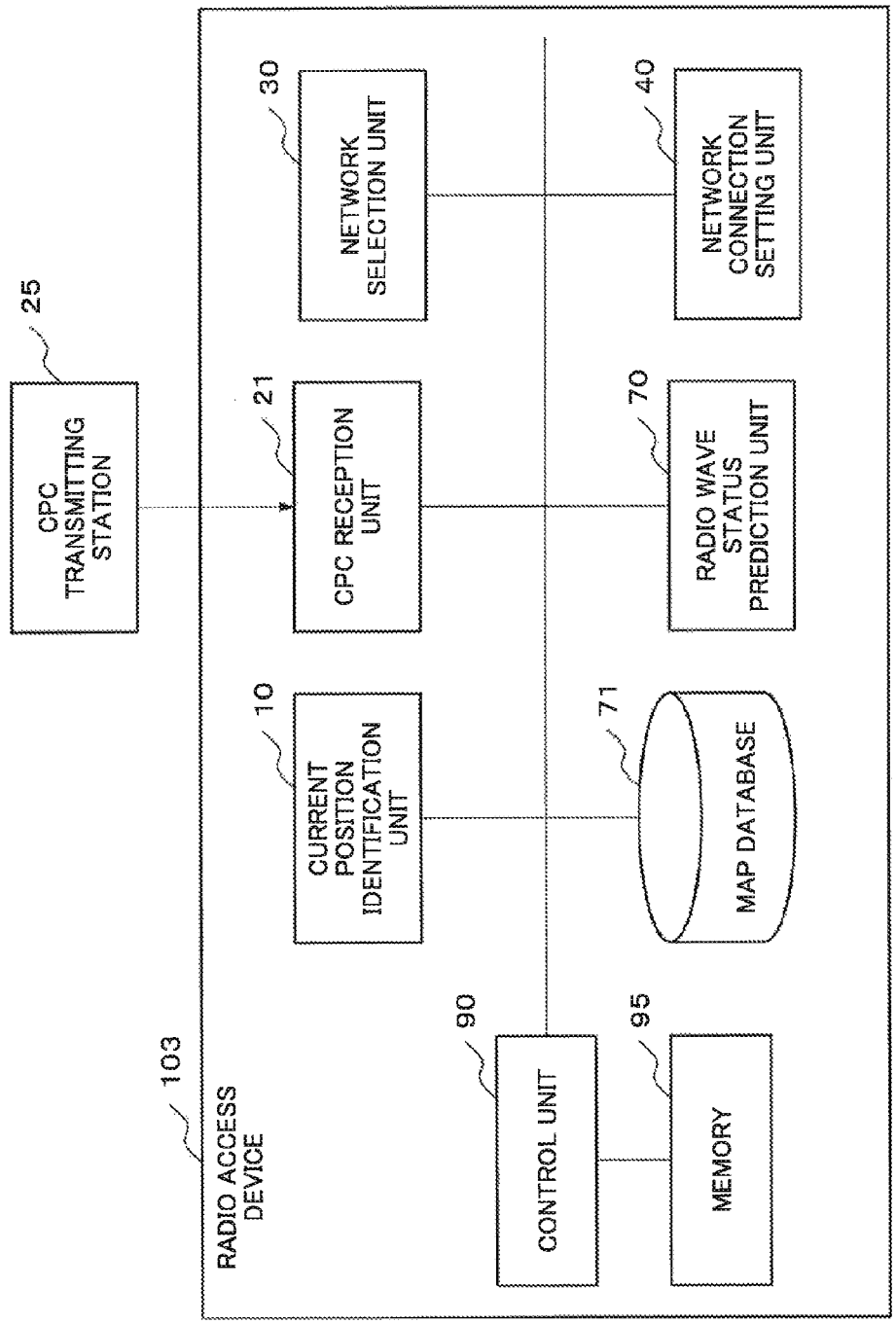
[FIG. 10] is a block diagram illustrating an exemplary configuration of a radio access device according to the fifth exemplary embodiment of the present invention.

FIG. 10 is a block diagram illustrating an exemplary configuration of a radio access device 103 according to the fifth exemplary embodiment of the present invention. The radio access device 103 of this exemplary embodiment newly includes a radio wave status prediction unit 70 (radio wave status prediction means) and a map database 71 in addition to the radio access device 100 of the second exemplary embodiment shown in FIG. 2. In the radio access device 103, because the current position identification unit 10, the network selection unit 30, the network connection setting unit 40, the control unit 90 and the memory 95 are the same as the radio access device 100 of the second exemplary embodiment, their description will be omitted.

A CPC reception unit 21 includes a function which receives CPC information broadcasted in CPC coverage same as the CPC reception unit 20 of the second exemplary embodiment. However, the CPC information transmitted in this exemplary embodiment is not the one in which information is stored for each area divided into a mesh as was indicated in the second exemplary embodiment, but information about a base station of an available network. For example, included in this CPC information is information such as an installation position, a frequency or transmission power of a base station. Moreover, an available area of a network may be given by a distance from a base station.

The radio wave status prediction unit 70 estimates a radio wave status at a current position of the radio access device 103 or in its surrounding using the CPC information received by the CPC reception unit 21. Specific prediction method of a radio wave status in the radio wave status prediction unit 70 will be described later.

The map database 71 is a database in which map data used for an estimation of a radio wave status by the radio wave status prediction unit 70 is stored. Specifically, in addition to data such as ups and downs of a landscape or a building coverage area ratio, data about an outline or a height of each building may be stored.

Figure 11:
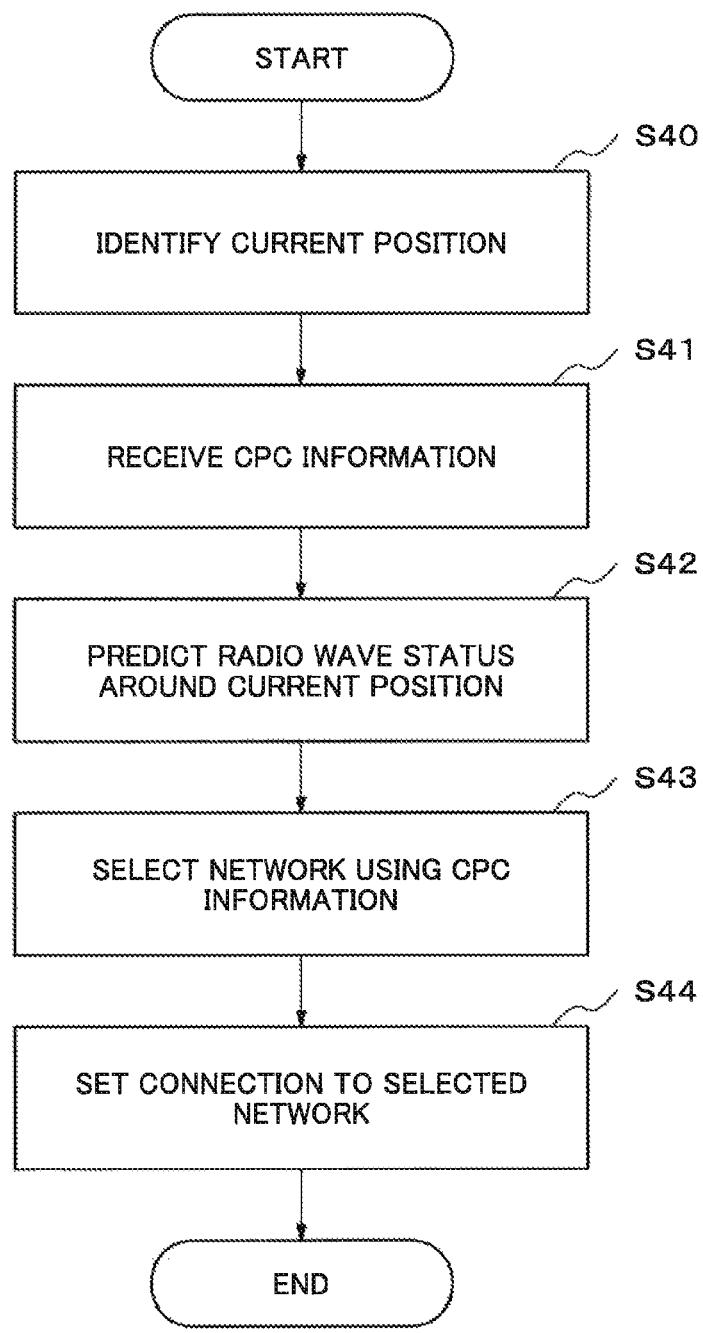
[FIG. 11] is a flow chart illustrating an example of operation of the radio access device shown in FIG. 10.

FIG. 11 is a flow chart illustrating an example of operation of the radio access device 103 shown in FIG. 10. First, the current position identification unit 10 identifies a current position of the radio access device 102 (Step S40). Next, the CPC reception unit 20 receives CPC information broadcasted in CPC coverage (Step S41). Further, the CPC information received here is information about a base station of an available network, and, for example, information such as an installation position, a frequency or transmission power of a base station is included. Moreover, an available area of the network concerned may be given by a distance from the base station.

The radio wave status prediction unit 70 estimates a radio wave status at the current position of the radio access device 103 or in its surrounding using the received CPC information (Step S42). For example, in the CPC information, in case an available area of a network is given by a distance from the base station, the radio wave status at the current position of the radio access device 103 may be predicted using information of these distances. In this case, the map database 71 becomes unnecessary. Or, a radio wave status may be predicted by calculating a propagation loss between a base station of a network and a current position of the radio access device 103 using the Okumura—Hata model or an existing radio wave propagation model such as a ray-tracing technique, and by using the calculated propagation loss. In case a statistical model such as the Okumura—Hata model is used, it is desirable to utilize data stored in the map database 71 such as ups and downs of a landscape and a building coverage area ratio. On the other hand, in case a deterministic radio wave propagation estimation method such as a ray-tracing method is used, it is desirable to utilize data about an outline or a height of each building in addition to data of ups and downs of a landscape stored in the map database 71. The prediction processing mentioned above is carried out not only to the current position of the radio access device 103, but also to a receiving point in a mesh defined in the surrounding similarly. Here, the surrounding of the current position of the radio access device 103 is, for example, within a predetermined distance (1 km, for example) from the current position. By using the prediction result of the obtained radio wave status, available network information is grasped, and it is stored in the memory. By the processing, the same state is realized as the state in which the CPC information was obtained in a mesh in the second exemplary embodiment.

Because processing of Step S43 (network selection processing using the CPC information) and processing of Step S44 (connection setting processing to a selected network) in FIG. 11 are as have been described in the second exemplary embodiment, the description here will be omitted.

Further, in the description above, as an example in which the fifth exemplary embodiment (that is, a structure which grasps available network information by an estimation of the radio wave status) is applied, a case where it was applied to the second exemplary embodiment was given as an example. However, it is possible for the fifth exemplary embodiment to be applied to the third or the fourth exemplary embodiment described above or to an exemplary embodiment which combined at least two among the second to the fourth exemplary embodiment.

Further, as for processing in case there exists on a user side a limitation or a priority for a network which becomes a connection target, it is the same as described in the second exemplary embodiment.

According to the fifth exemplary embodiment described above, same as the second exemplary embodiment, a network is selected which is capable of continuous communication without cut off even in case the radio access device 103 moves from the current position after connection. Further, in case of this exemplary embodiment, by the radio access device 103, available network information is grasped by an estimation of a radio wave status. As a result, even if information is not stored in the transmitted CPC information for each area divided into a mesh, it is possible to handle it. That is, in a system which transmits such CPC information, a network is selected which is capable of continuous communication without cut off.

[The Sixth Exemplary Embodiment]

Figure 12:
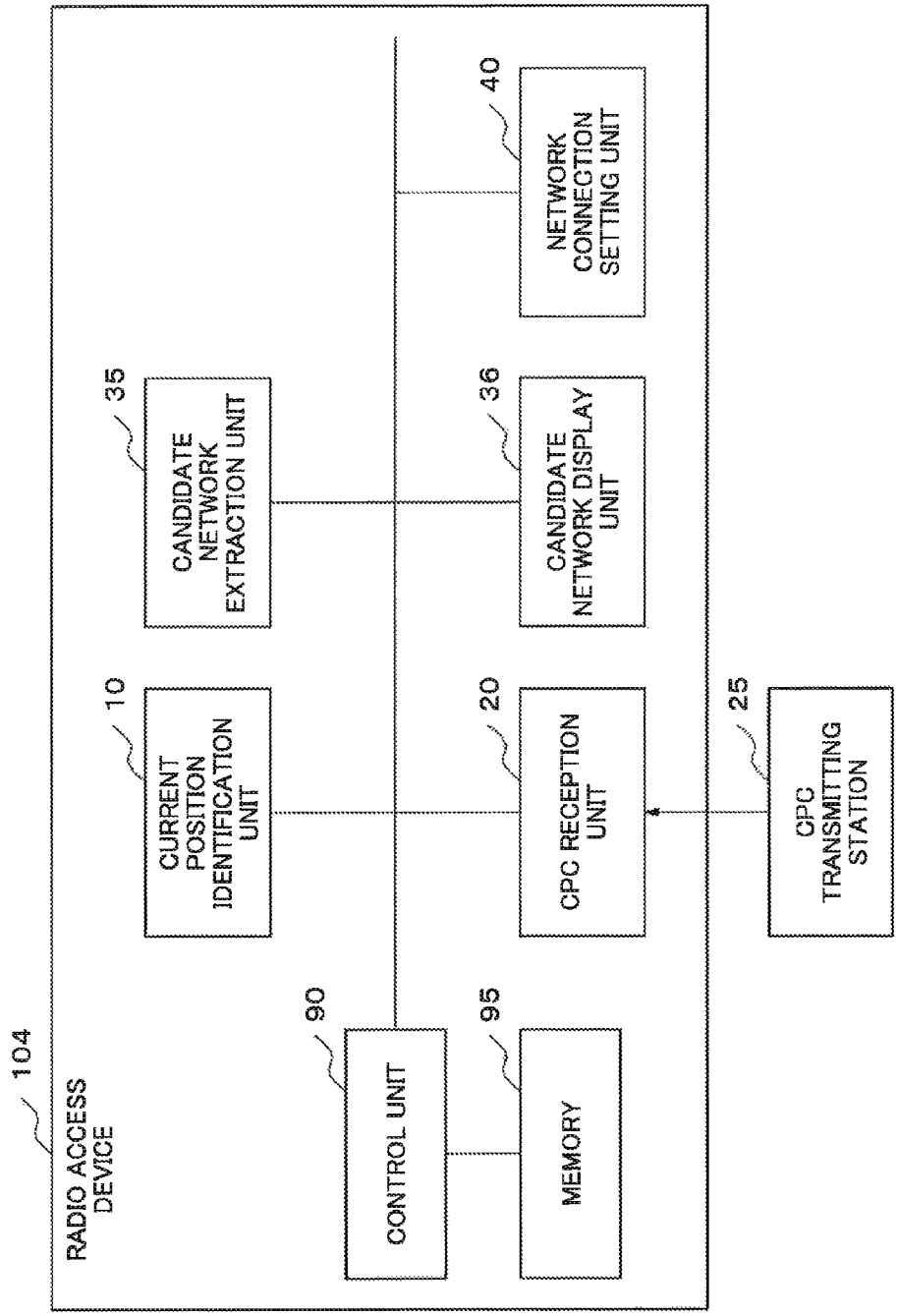
[FIG. 12] is a block diagram illustrating an exemplary configuration of a radio access device according to the sixth exemplary embodiment of the present invention.

FIG. 12 is a block diagram illustrating an exemplary configuration of a radio access device 104 according to the sixth exemplary embodiment of the present invention. The radio access device 104 of this exemplary embodiment includes a candidate network extraction unit 35 (candidate network extraction means) and a candidate network display unit 36 (candidate network display means) instead of the network selection unit 30 of the radio access device 100 of the second exemplary embodiment shown in FIG. 2.

In the radio access device 104, because the current position identification unit 10, the CPC reception unit 20, the network connection setting unit 40, the control unit 90 and the memory 95 are the same as those in the radio access device 100 of the second exemplary embodiment, their description will be omitted.

The candidate network extraction unit 35 extracts a candidate of a network (candidate network) which the radio access device 104 can connect using network information received by the CPC reception unit 20. Further, the candidate network extraction unit 35 calculates an available range which represents to which degree of range each network is available. Specific extraction method of a candidate network will be described later.

The candidate network display unit 36 includes a display function and a selection function. The display function is a function which displays a list of candidate networks extracted by the candidate network extraction unit 35 on a display screen (not shown in FIG. 12) of the radio access device 104. The selection function is a function which makes a user of the radio access device 104 select one from among the displayed list of the candidate networks as a network of a connection target.

Figure 13:
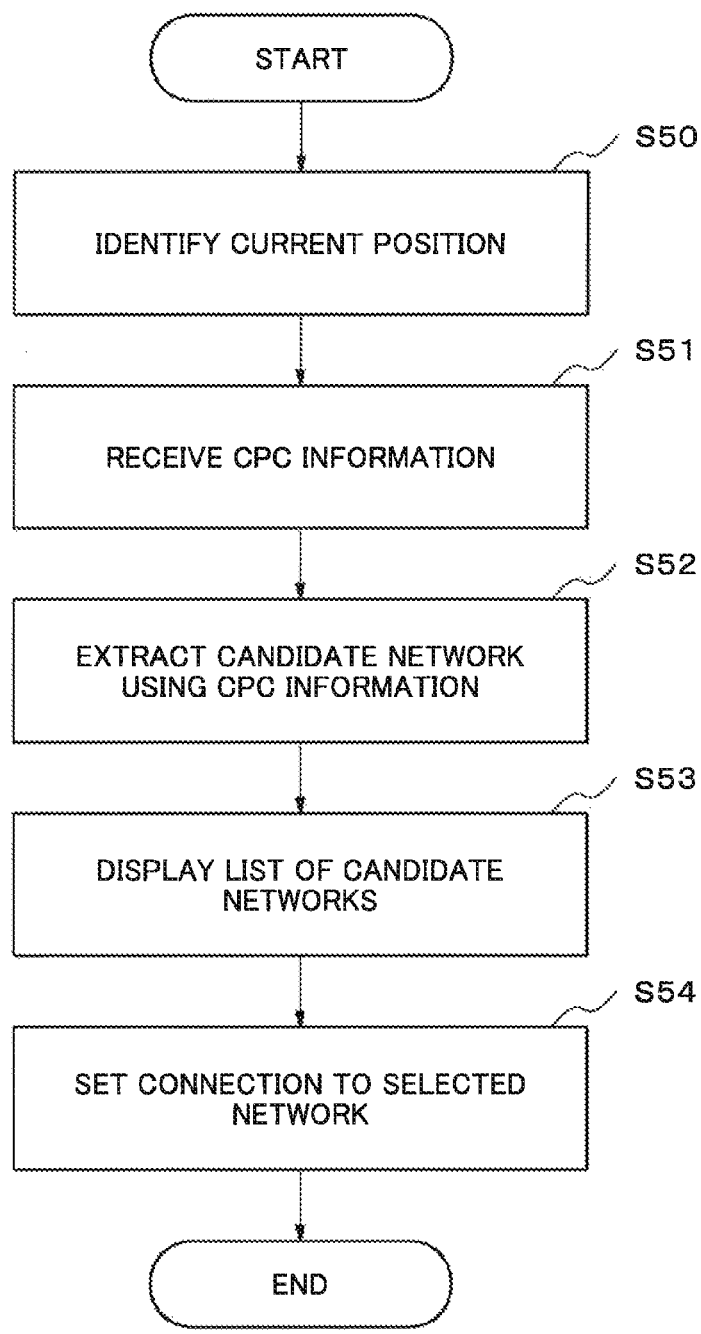
[FIG. 13] is a flow chart illustrating an example of operation of the radio access device shown in FIG. 12.

FIG. 13 is a flow chart illustrating an example of operation of the radio access device 104 shown in FIG. 12. In the flow chart concerned, identification processing of a current position (processing of Step S50), reception processing of CPC information (processing of Step S51) and connection setting processing to a selected network (processing of Step S54) are as have been described in the second exemplary embodiment.

The candidate network extraction unit 35 extracts a candidate of a network (candidate network) which the radio access device 104 can connect using the received CPC information (Step S52). Further, the candidate network extraction unit 35 investigates to which degree of range each network is available based on the current position. Specifically, first, an available network at the current position of the radio access device 104 is extracted. The network extracted here is made a candidate network. Next, by using the same technique as the technique indicated by the first technique of Step S13 in FIG. 4 of the second exemplary embodiment, an available range is grasped based on the current position of the radio access device 104. In that case, within the received CPC information, information of other than the mesh which corresponds to the current position is also utilized. Here, it is defined by a distance from the current position to a boundary of the available range. However, because an area where a network is available does not necessarily spread like a circle with the current position as a center, here, the distance is defined along a direction with a smallest available range. However, a method to define an available range is not limited to the method described above as far as it represents an available range based on the current position. For example, instead of defining a distance along a direction with a smallest available range, it may be defined by an average over all the directions, or may be defined by an area instead of a distance.

Going back to the description of FIG. 13, the candidate network display unit 36 displays the list of the candidate networks extracted in Step S52 on a display screen of the radio access device 104 (Step S53).

FIG. 14 indicates an example of display of a list of candidate networks displayed on a display screen of the radio access device 104. As shown in FIG. 14, when displaying a candidate network, it is desirable to display, in addition to a name of the network, an operator and so on, information corresponding to the available range calculated by the candidate network extraction unit 35 together. Also, a user of the radio access device 104 can select one from among the displayed list of the candidate networks as a network of a connection target. A network selected by the user will be a network of a connection target.

Further, in the description above, as an example in which the sixth exemplary embodiment (that is, a structure which extracts and displays a list of candidate networks) is applied, a case where it was applied to the second exemplary embodiment was given as an example. However, it is possible for the sixth exemplary embodiment to be applied to each of the third to the fifth exemplary embodiment described above or to an exemplary embodiment which combined at least two among the second to the fifth exemplary embodiment. Further, in case extension is applied to the second exemplary embodiment, contents displayed on a display screen may be not information corresponding to an available range but information corresponding to an availability ratio.

According to the sixth exemplary embodiment described above, same as the second exemplary embodiment, a network is selected which is capable of continuous communication without cut off even in case the radio access device 104 moves from the current position after connection. Further, in case of this exemplary embodiment, a list of candidate networks is displayed on the radio access device 104, and it becomes possible for a user to select one of them. As a result, a connection to a network which the user does not intend can be prevented. Also, because information corresponding to an available range or an availability ratio is displayed as information of a candidate network, the user can perform network selection considering the radio wave status not only at the current position but also in the surrounding.

[The Seventh Exemplary Embodiment]

Figure 15:
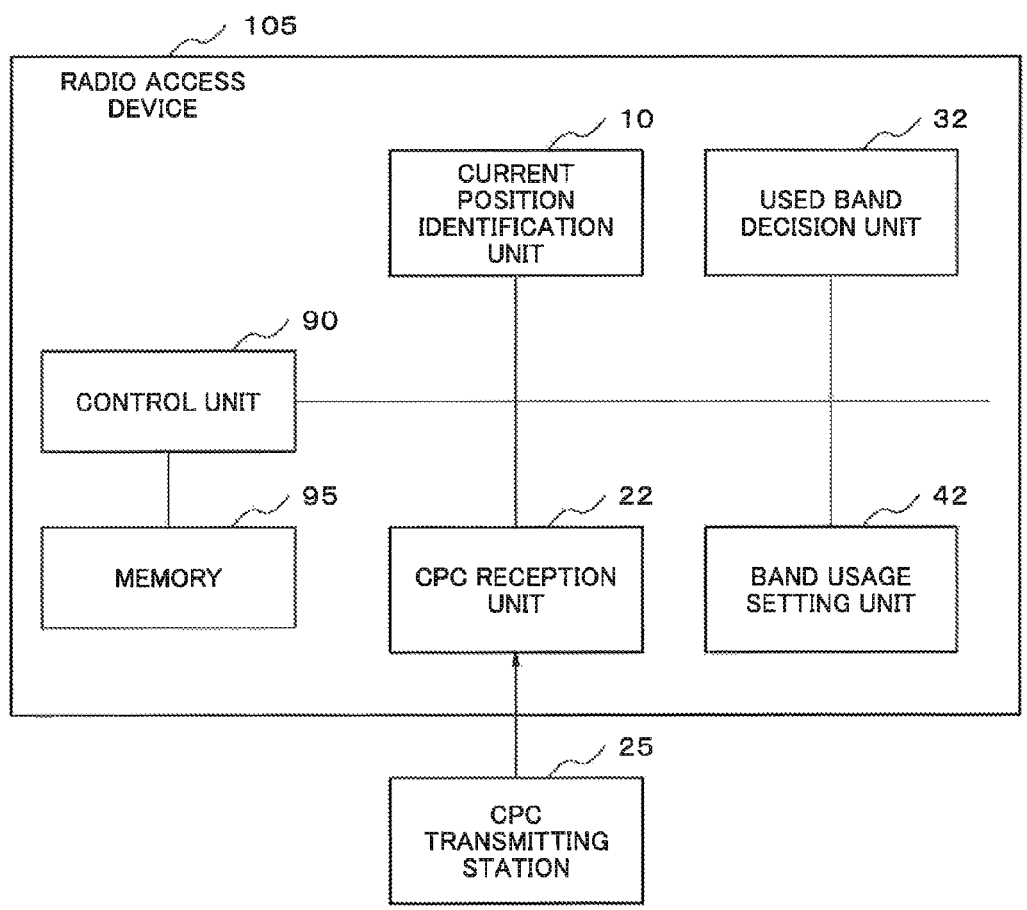
[FIG. 15] is a block diagram illustrating an exemplary configuration of a radio access device according to the seventh exemplary embodiment of the present invention.

FIG. 15 is a block diagram illustrating an exemplary configuration of a radio access device 105 according to the seventh exemplary embodiment of the present invention. The radio access device 105 includes a used band decision unit 32 (used band decision means) instead of the network selection unit 30 of the radio access device 100 of the second exemplary embodiment shown in FIG. 2 and, further, includes a band usage setting unit 42 (band usage setting means) instead of the network connection setting unit 40.

In the radio access device 105, because the current position identification unit 10, the control unit 90 and the memory 95 are the same as those in the radio access device 100 of the second exemplary embodiment, their descriptions will be omitted.

A CPC reception unit 22 includes a function which, same as a case of the second exemplary embodiment, receives CPC information broadcasted in CPC coverage and stores it in the memory 95. However, the radio access device 105 of this exemplary embodiment is a system to perform secondary use of a frequency band which is originally assigned to a different system when the frequency band is not used. Therefore, concerning the transmitted CPC information; there is a case where detailed information of a network (in this case, specifically, communication system) operating in the CPC coverage is described same as the second exemplary embodiment, and a case where a frequency band which a system to perform a secondary use can use is described.

The used band decision unit 32 decides a frequency band which is available for the radio access device 105 using the CPC information received by the CPC reception unit 22. Specific decision method of a used band will be described later.

The band usage setting unit 42 performs usage setting of the frequency band decided by the used band decision unit 32. Specifically, a frequency is set by rewriting control software of its own.

Figure 16:
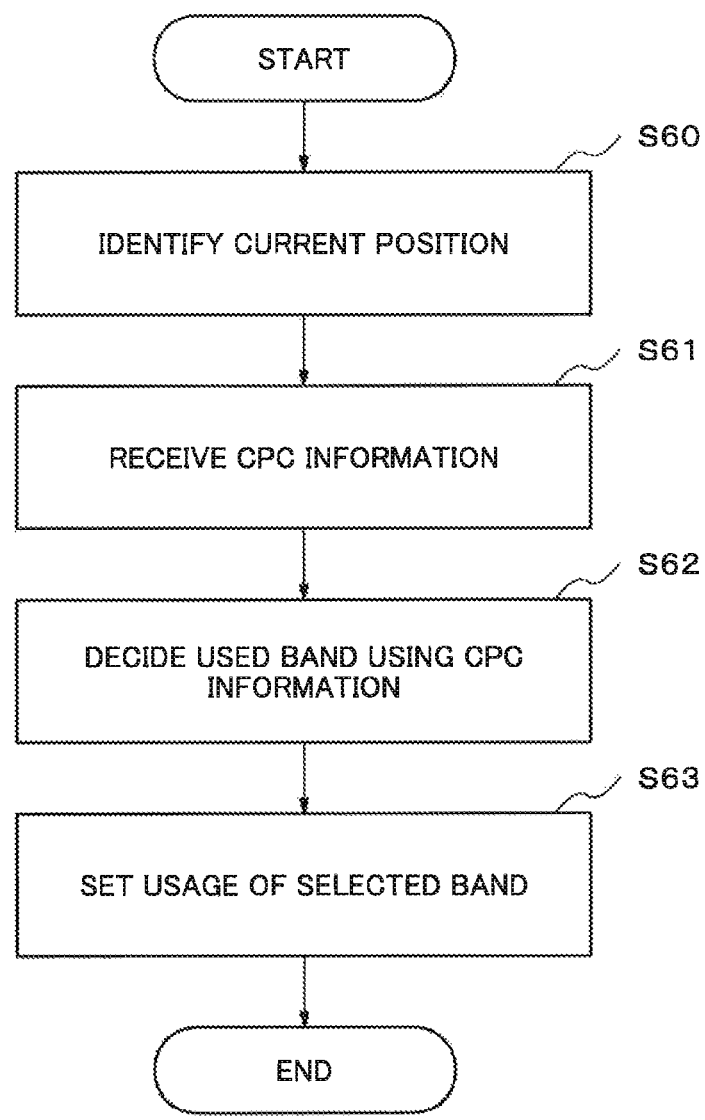
[FIG. 16] is a flow chart illustrating an example of operation of the radio access device shown in FIG. 15.

FIG. 16 is a flow chart illustrating an example of operation of the radio access device 105 shown in FIG. 15. In the flow chart concerned, identification processing of a current position (processing of Step S60) is as has been described in the second exemplary embodiment.

Next, the CPC reception unit 22 receives CPC information broadcasted in CPC coverage (Step S61). In case the CPC information is "detailed information of a network" operating in the CPC coverage, the CPC reception unit 22 stores its usage status in the memory 95, while the CPC information is a "usable frequency band" for a system which performs a secondary use, it stores the band information in the memory 95.

The used band decision unit 32 decides a frequency band which is available for the radio access device 105 using the received CPC information (Step S62). Specifically, in case the CPC information is detailed information of a network operating in the CPC coverage, the used band decision unit 32 extracts a frequency band which is not used as a candidate frequency band available for a secondary use. Or, in case the CPC information is a usable frequency band for a system to perform a secondary use, the used band decision unit 32 extracts a frequency band indicated in the CPC information as a candidate frequency band available for a secondary use. As a technique to select a frequency band which becomes a target for use from the extracted frequency band, the same technique as the technique indicated in the second exemplary embodiment is applied. Specifically, in the second exemplary embodiment, a network selection method in case CPC information is only information of an operator, a radio access technology and a frequency of an available network may be executed while replacing "network" by "frequency band".

Going back to the description of FIG. 16, the band usage setting unit 42 performs usage setting of a band for the frequency band selected in Step S62 (Step S63). Specifically, the band usage setting unit 42 sets a frequency by rewriting control software of its own.

Further, in the description above, as an example in which the seventh exemplary embodiment (that is, a structure in which a system to perform a secondary use selects a frequency band) is applied, a case where it was applied to the second exemplary embodiment was given as an example. However, it is possible for the seventh exemplary embodiment to be applied to each of the third to the sixth exemplary embodiment described above or to an exemplary embodiment which combined at least two among the second to the sixth exemplary embodiment.

In the seventh exemplary embodiment described above, a system which performs a secondary use (specifically, the radio access device 105, for example) selects an available frequency band considering; in addition to the available band information at the current position of its own, available band information in the surrounding also. Accordingly, a frequency band is selected which is capable of continuous communication without cut off even in case the radio access device 105 moves from the current position after connection.

Further, the first to the seventh exemplary embodiment described above can also be embodied as certain hardware, for example, as a circuit.

Also, the first to the seventh exemplary embodiment described above can be made to be controlled by a computer circuit (CPU (Central Processing Unit), for example) which is not illustrated based on a control program, and to operate. In the case, these control programs are stored, for example, in a storage medium inside a radio access device or a radio access system or in an external storage medium, and they are read out by the computer circuit mentioned above and executed. As a storage medium inside, for example, ROM (Read Only Memory), a hard disk and so on can be mentioned. Also, as an external storage medium, for example, a removable media, a removable disk and so on can be mentioned.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2009-287102 filed on Dec. 18, 2009, the disclosure of which is incorporated herein in its entirety by reference.

REFERENCE SIGNS LIST

10 Current position identification unit
20, 21, 22 CPC reception unit
25 CPC transmitting station
30, 31 Network selection unit
32 Used band decision unit
35 Candidate network extraction unit
36 Candidate network display unit
40 Network connection setting unit
42 Band usage setting unit
50 Moving range prediction unit
60 CPC request unit
70 Radio wave status prediction unit
71 Map database
90 Control unit
95 Memory
100, 101, 102, 103, 104, 105, 500 Radio access device 510 Acquisition unit
520 Selection unit

What is claimed is:

1. A radio access device comprising:
   an acquisition unit which acquires network information about a network to be used for communication from an administration entity which administers the information; and
   a selection unit which, based on said network information acquired, obtains first information which indicates availability of a network at a current position of its own and second information which indicates availability of a network at a position other than the current position of its own, and selects a network to be used for communication using said first and the second information obtained.

2. The radio access device according to claim 1, wherein said selection unit selects a network to be used for communication based on a spatial availability of a network obtained based on said first and the second information.

3. The radio access device according to claim 2, wherein said spatial availability is availability within a predetermined range based on a current position of said radio access device.

4. The radio access device according to claim 2, wherein said spatial availability is calculated using a weight defined at a predetermined position in a surrounding of a current position of said radio access device.

5. The radio access device according to claim 2, wherein said network information includes at least an identifier representing a geographical available range of a network, and said spatial availability is obtained by at least considering the identifier.

6. The radio access device according to claim 2, further comprising a moving range prediction unit which predicts a range to which said radio access device moves in a predetermined time, wherein said selection unit selects a network to be used for communication using a spatial availability of a network in said predicted moving range.

7. The radio access device according to claim 1, further comprising a time prediction unit which predicts a time which said radio access device takes for communication, wherein said selection unit selects, in case said time predicted exceeds a predetermined value, a network to be used for communication using said first and the second information.

8. The radio access device according to claim 1, further comprising a radio wave status prediction unit which predicts a radio wave status in a surrounding of said radio access device based on said network information, wherein said selection unit obtains said first and the second information based on said radio wave status prediction result.

9. The radio access device according to claim 1, further comprising:
   a candidate network extraction unit which extracts a network candidate available for said radio access device based on said network information; and
   a candidate network display unit which displays a list of said candidate networks extracted.

10. The radio access device according to claim 1, wherein said network information is broadcasted from said administration entity.

11. The radio access device according to claim 1, wherein said network information is transmitted from said administration entity based on a request from said radio access device.

12. The radio access device according to claim 1, wherein said administration entity is installed in at least one network among networks.

13. The radio access device according to claim 1, wherein said administration entity is installed as a network different from each of networks.

14. The radio access device according to claim 1, wherein said network is a communication system.

15. The radio access device according to claim 1, wherein said network is a frequency band.

16. The radio access device according to claim 1, wherein said network information is CPC information.

17. A radio access system comprising:
   a radio access device comprising a function to select, in an environment where a plurality of networks is intermingled, one from among these networks; and
   an administration entity which administers network information about a network which said radio access device is to use for communication; wherein said radio access device comprises:
   an acquisition unit which acquires said network information from said administration entity; and
   a selection unit which, based on said network information acquired, obtains first information which indicates availability of a network at a current position of its own and second information which indicates availability of a network at a position other than the current position of its own, and selects a network to be used for communication using said first and the second information obtained.

18. A network selection method of a radio access device comprising a function to select, in an environment where a plurality of networks is intermingled, one from among these networks, said network selection method comprising the steps of:
   acquiring network information about a network to be used for communication from an administration entity which administers the information; and
   obtaining, based on said network information acquired, first information which indicates availability of a network at a current position of its own and second information which indicates availability of a network at a position other than the current position of its own, and selecting a network to be used for communication using said first and the second information obtained.

19. A non-transitory computer-readable recording medium in which a network selection program in a radio access device comprising a function to select, in an environment where a plurality of networks is intermingled, one from these networks is recorded, wherein said network selection program makes a computer of said radio access device execute the proceedings of:
   acquiring network information about a network to be used for communication from an administration entity which administers the information concerned; and
   obtaining, based on said network information acquired, first information which indicates availability of a network at a current position of said radio access device and second information which indicates availability of a network at a position other than the current position, and selecting a network to be used for communication using said first and the second information obtained.

* * * * *